US011206165B2

(12) United States Patent
Muralidhar

(10) Patent No.: US 11,206,165 B2
(45) Date of Patent: Dec. 21, 2021

(54) SYSTEM AND METHOD FOR ACCOMMODATING MORE NUMBER OF USERS OVER RESOURCE BLOCKS IN AN UPLINK TRANSMISSION

(71) Applicant: Karthik Muralidhar, Bengaluru (IN)

(72) Inventor: Karthik Muralidhar, Bengaluru (IN)

( * ) Notice: Subject to any disclaimer, the term of this patent is extended or adjusted under 35 U.S.C. 154(b) by 0 days.

(21) Appl. No.: 16/744,207

(22) Filed: Jan. 16, 2020

(65) Prior Publication Data

US 2020/0235974 A1 Jul. 23, 2020

(30) Foreign Application Priority Data

Jan. 18, 2019 (IN) .............................. 201941002188
Jan. 18, 2019 (IN) .............................. 201941002228

(51) Int. Cl.
*H04W 72/04* (2009.01)
*H04L 27/26* (2006.01)
*H04L 25/02* (2006.01)
*H04L 5/10* (2006.01)
*H04L 5/00* (2006.01)

(52) U.S. Cl.
CPC ........ *H04L 27/2607* (2013.01); *H04L 5/0051* (2013.01); *H04L 5/10* (2013.01); *H04L 25/0214* (2013.01); *H04L 25/0226* (2013.01); *H04L 27/2636* (2013.01)

(58) Field of Classification Search
CPC .............. H04L 27/2607; H04L 27/2636; H04L 27/2613; H04L 25/0226; H04L 25/0214; H04L 25/022; H04L 5/10; H04L 5/0051
See application file for complete search history.

(56) References Cited

U.S. PATENT DOCUMENTS

| | | | | |
|---|---|---|---|---|
| 2012/0140717 A1* | 6/2012 | Zhu | .................. | H04L 5/0053 370/329 |
| 2012/0176981 A1* | 7/2012 | Baldemair | .......... | H04L 25/0226 370/329 |
| 2013/0229989 A1* | 9/2013 | Natarajan | ............. | H04L 5/0048 370/329 |
| 2015/0078273 A1* | 3/2015 | Aiba | .................... | H04L 5/0073 370/329 |
| 2017/0366311 A1* | 12/2017 | Iyer | .................. | H04L 1/0026 |
| 2018/0183627 A1* | 6/2018 | Wei | .................... | H04L 27/0014 |
| 2019/0013909 A1* | 1/2019 | Li | ...................... | H04L 25/0226 |
| 2019/0044775 A1* | 2/2019 | Zhang | ................ | H04L 27/2607 |
| 2019/0053287 A1* | 2/2019 | Lin | ................... | H04W 74/0833 |
| 2019/0215110 A1* | 7/2019 | Yang | ................. | H04W 76/27 |

* cited by examiner

*Primary Examiner* — Hassan Kizou
*Assistant Examiner* — Mahbubul Bar Chowdhury

(57) ABSTRACT

A method for accommodating users in an uplink channel is provided. The method comprises a processor for selecting a region of sub carriers in a frequency domain, wherein a channel value of a plurality of users over the selected region varies gradually. The processor is further configured to select the sub carriers within the selected region of sub carriers by skipping the sub carriers by an integer value which is 0 or more than 0. A product of a known sequence and an exponential sequence is transmitting over the selected sub carriers, wherein the exponential sequence is characterized by a cyclic shift value. Further, a base station is configured to perform channel estimation of the users using the received selected sub carriers within the selected region and the processor is also configured to perform data detection for the users over the selected sub carriers using the estimated channel value.

19 Claims, 17 Drawing Sheets

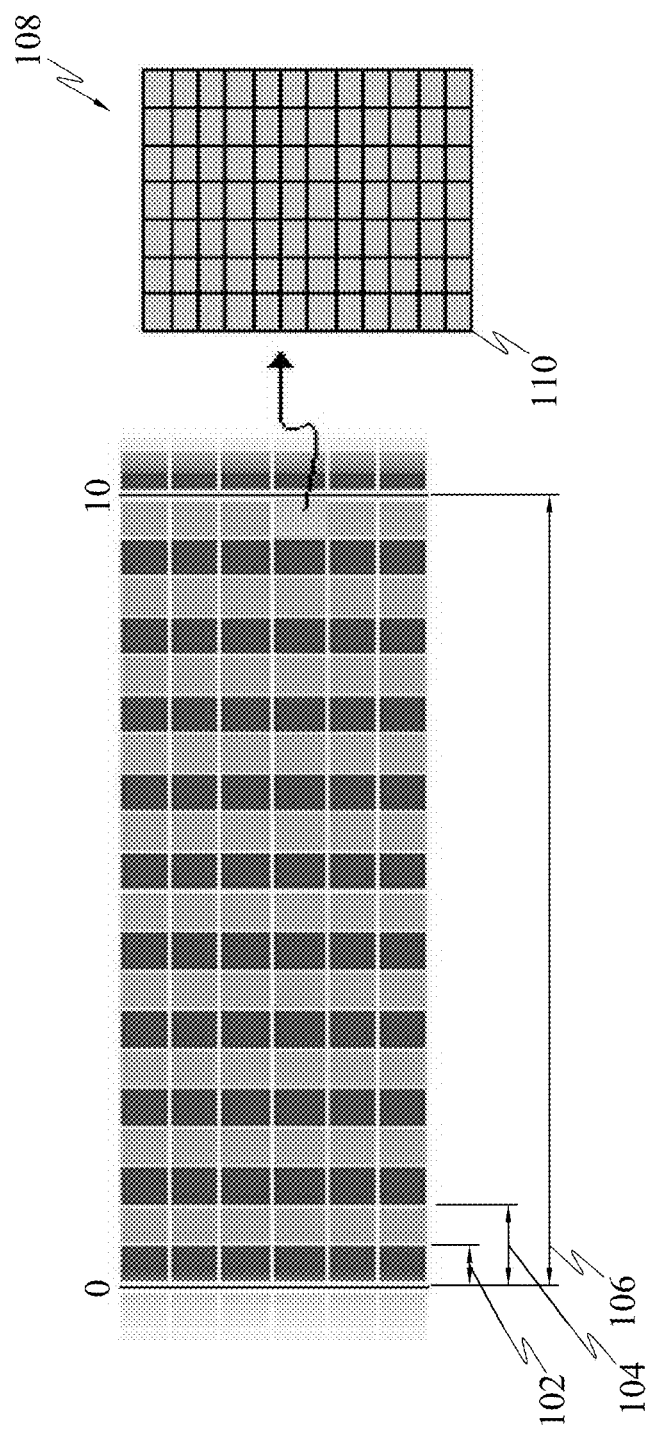

(PRIOR ART)

(PRIOR ART)

SYSTEM AND METHOD FOR ACCOMMODATING MORE NUMBER OF USERS OVER RESOURCE BLOCKS IN AN UPLINK TRANSMISSION

BACKGROUND

Unless otherwise indicated herein, the materials described in this section are not prior art to the claims in this application and are not admitted to being prior art by inclusion in this section.

FIELD OF INVENTION

The subject matter in general relates to LTE network systems. More particularly, but not exclusively, the subject matter is directed to accommodating greater number of users at a given instant of time in the LTE network system.

DISCUSSION OF RELATED ART

LTE (Long-Term evolution) is a standard for wireless broadband communication for mobile devices and data terminals. It increases the capacity and speed using a different radio interface together with core network improvements. Pertaining to cellular networks, LTE works on two different types of air interfaces (radio links), one is downlink and the other is uplink. The uplink is the transmission path from a mobile station (cell phone) to a base station (cell site) and the downlink is transmission path from the base station to the mobile station or the cell phone. Physical uplink shared channel (PUSCH) is used to carry the uplink user's information data.

LTE standard may be configured to comprise two types of frame structure, type 1 (FDD) and type 2 (TDD), wherein, type 1 uses Frequency Division Duplexing (uplink and downlink separated by frequency) and type 2 uses Time Division Duplexing (uplink and downlink separated in time). FIG. 1A is a representation of an LTE frame structure type 1, wherein the vertical axis corresponds to frequency and the horizontal axis corresponds to time. The basic type 1 LTE frame structure comprises a frame 106 of length 10 ms (time domain), which is further divided into 10 subframes 104. Each of the subframes 104 are further divided into 2 slot 102 of 0.5 ms. Each slot 102 is configured to comprise 7 symbols 110. In the frequency domain (vertical axis), LTE frame structure comprises multiple channels or subcarriers. A resource block 108 is the smallest unit of resources that can be allotted to a UE (user equipment). That is to say, data to be transmitted is allocated to one or more resource blocks 108. The number of subcarriers per resource block 108 is 12. Each of the resource block 108 is configured to comprise 12 subcarriers and 7 symbols 110. The number of subcarriers may be determined by the transmission bandwidth.

The UEs may transmit the signals through a medium called channel. The channel coefficient 'h' may be constant over one resource block and may change gradually over the next resource block. FIG. 1B represent the slowly varying time domain of the channel. The slowly varying time domain signal h=x(t) over time 'T' can be represented as;

$$x(t) = \sum_{i=-\infty}^{i=\infty} X(i) e^{\frac{j2\pi it}{T}} \quad 0 < t < T \quad (1)$$

Since x(t) is a slowly varying signal, x(t) can be approximated as $$x(t) \sum_{i=-1}^{i=1} X(i) e^{\frac{j2\pi it}{T}}; (0 < t < T).$$

Referring to FIG. 1C, Fast Fourier Transformation (FFT) may be applied to x(t), for signal processing and analysis. As an example, but not limited to, FFT may be applied to the signal for estimation of channel. The signal after applying FFT may be represented as $$X(i) = \frac{1}{T} \int_0^T x(t) e^{-\frac{j2\pi it}{T}} dt \quad (2)$$

The frequency domain of the signal may comprise of bins occupying the $0^{th}$, $1^{st}$ and $-1^{st}$ and so on points, wherein the value of the signal occupying the $0^{th}$ bin point may be X(0), $1^{st}$ bin point may be X(1) and $-1^{th}$ bin point may be X(-1). Energy of the other bins ($2^{nd}$ and $-2^{nd}$ bin) may be negligible. That is to say, the value of the bin points (X(2) and X(-2)) corresponding to $2^{nd}$ and -2nd bin may be negligible. From equation (2) and the FFT of the signal, the leakage energy or the side lobe energy may be defined as $$\rho = \frac{|X(1)|^2 + |X(-1)|^2}{|X(1)|^2 + |X(-1)|^2 + |X(0)|^2},$$

wherein the denominator of the equation corresponds to the total energy.

In the LTE communication, non-data associated control signalling is transmitted on a physical uplink control channel (PUCCH) located on the edges of system bandwidth. A PUCCH format are of two type; format 1 and format 2. FIG. 1D is a schematic representation of the 2 slots; slot 0 102a and slot 1 102b of format 1 of PUCCH. Symbols 110a, 110b, 110f and 110g of slot 0 102a (blank symbols of slot 0 102a) and symbols 110h, 110i, 110m and 110n of slot 1 102b are for carrying data and symbols 110c, 110d and 110e of slot 0 102a (dashed symbols of slot 0 102a) and symbols 110j, 110k and 110l of slot 1 102b (dashed symbols of slot 1 102b) are for carrying demodulation reference signal (DMRS). The data symbols are indexed by b=1, 2, 3, 4 for slot 0 102a and b=5, 6, 7, 8 for slot 1 102b. The DMRS signals may be indexed by a=1, 2, 3 for slot 0 102a and a=4, 5, 6 for slot 1 102b.

A transmitted DMRS signal over the DMRS symbols 110c, 110d and 110e may be the 12 subcarriers over each of the DMRS symbols 110c, 110d and 110e multiplied by a first complex scalar value $W_a$ per DMRS symbol, a 12×1 Zadaoff-Chu sequence (constant for all users) and a 12×1 exponential sequence (indexed by a cyclic shift) specific to that user in that symbol. A transmitted data signal over each of the data symbols 110a, 110b, 110f and 110g may be the 12 subcarriers over the data symbols 110a, 110b, 110f and 110g multiplied by second complex scalar value $\overline{w}_b$, per DMRS symbol, a scalar complex data value $d_b$ per DMRS symbol, a 12×1 Zadaoff-Chu sequence (constant for all users) and a 12×1 exponential sequence indexed by the cyclic shift specific to that user in that symbol.

FIG. 1E is a representation of the 2 slots; slot 0 102c and slot 1 102d of format 2 of PUCCH. Symbols 110a', 110c', 110d', 110e' and 110g' of slot 0 102c (blank symbols of slot 0 102c) and symbols 110h', 110j', 110k', 110l' and 110n' of slot 1 102d are for carrying data and symbols 110b' and 110f' of slot 0 102c (dashed symbols of slot 0 102c) and symbols 110i' and 110m' of slot 1 102d (dashed symbols of slot 1 102d) are for carrying demodulation reference signal (DMRS). The data symbols are indexed by b=1, 2, 3, 4, 5 for slot 0 102c and b=5, 6, 7, 8, 9, 10 for slot 1 102d. The DMRS signals may be indexed by a=1, 2, for slot 0 102c and a=3, 4 for slot 1 102d.

IN PUCCH format 1, the scalar complex data value $d_b$ assumes the same value $d_b$=d across all the symbols 110 and for format 2, $w_a = \overline{w}_b = 1$.

Referring to FIG. 1F and FIG. 1G, for decoding the data value $d_b$ transmitted on the data symbol, a first LTE receiver $X_{LTE\_CE\_SLOT}$ 114a may be used for receiving the DMRS signal transmitted over the DRMS symbols over each slot for estimating the channel coefficient '$h_i$', (i indicates the $i^{th}$ user) and the estimated channel coefficient may be fed to a second LTE receiver. The output of a second LTE receiver $X_{LTE\_DATA\_SYM}$ 114b may be the data value $d_b$.

Referring to FIG. 1F, for estimating the channel coefficient '$h_i$' (for decoding the data value $d_b$) of individual users over 7 symbols 110 and 12 subcarriers of the slot 102, values $Y_{DMRS}$, $W_{DMRS}$, an indicator may be provided as input to the first LTE receiver $X_{LTE\_CE\_SLOT}$ 114a.

Referring to FIG. 1D, for PUCCH format 1, $Y_{DMRS}$ may be a set of 3 scalar values and may be obtained by multiplying the received signal value of the 12 subcarriers in each of the DMRS symbols 110c, 110d and 110e of slot 0 102a and 110j, 110k and 110l of slot 1 102b by the conjugate of corresponding Zadaoff-chu sequence and the exponential sequence (indexed by cyclic shift) provided to the user and then adding all the 12 values in that DMRS symbol. In PUCCH format 1, $Y_{DMRS}$ may be set of 3 scalar values as each slot in LTE comprises of 3 DMRS symbols. $W_{DMRS}$ may be set of the first complex scalar values $w_a$, wherein a=1, 2, 3 for slot 0 102a and a=4,5,6 for slot 1 102b. The indicator may an indication of the type of PUCCH format. That is to say, the indicator indicates that the type of PUCCH format is format 1.

Referring to FIG. 1E, for PUCCH format 2, $Y_{DMRS}$ may be a set of 2 scalar values and may be obtained by multiplying the received signal value of the 12 subcarriers in DMRS symbols 110b' and 110f of slot 0 102c and 110i' and 110m' of slot 1 102d by the conjugate of corresponding Zadaoff-chu sequence and the exponential sequence indexed by the cyclic shift provided to the user and then adding all the 12 values. The PUCCH format 2 may be set of 2 scalar values as each slot in LTE comprises of 2 DMRS symbols. $W_{DMRS}$ may be unity. The indicator may be an indication of the type of PUCCH format. That is to say, the indicator indicates that the type of PUCCH format is format 2.

Referring to FIG. 1G, the output of the first receiver $X_{LTE\_CE\_SLOT}$ 114a ($h_i$) along with values $Y_{DATA}$, $W_{DATA}$ and the indicator may be fed to the second LTE receiver $X_{LTE\_DATA\_SYM}$ 114B for obtaining the complex data value $d_b$.

For PUCCH format 1, $Y_{DATA}$ may be a set of 4 scalar values and may be obtained by multiplying the received signal value of the 12 subcarriers in the data symbols 110a, 110b, 110f and 110g of slot 0 102a and 110h, 110i, 110m and 110n of slot 1 102b by the conjugate of corresponding Zadaoff-chu sequence and the cyclic shift provided to the user and then adding all the 12 values. In PUCCH format 1, $Y_{DATA}$ may be set of 4 scalar values as each slot in LTE comprises of 4 data symbols. $W_{DATA}$ may be set of the second complex scalar value $\overline{w}_b$, wherein b=1, 2, 3, 4 for slot 0 102a and a=5, 6, 7, 8 for slot 1 102b. The indicator may be an indication of the type of PUCCH format. That is to say, the indicator indicates that the type of PUCCH format is format 1.

For PUCCH format 2, $Y_{DATA}$ may be a set of 5 scalar values and may be obtained by multiplying the received signal value of the 12 subcarriers in data symbols, 110a', 110c', 110d', 110e' and 110g' of slot 0 102c and 110h', 110j', 110k', 110l' and 110n' of slot 1 102d by the conjugate of corresponding Zadaoff-chu sequence and the exponential sequence indexed by the cyclic shift provided to the user and then adding all the 12 values. The PUCCH format 2 may be set of 5 scalar values as each slot in LTE comprises of 5 data symbols. $W_{DATA}$ may be unity. The indicator may an indication of the type of PUCCH format. That is to say, the indicator indicates that the type of PUCCH format is format 2.

The output of the second LTE receiver $X_{LTE\_DATA\_SYM}$ 114b may be the data value d=$\hat{d}$. For PUCCH format 1, the output $\hat{d}$ may be a single value as the scalar complex data value $d_b$ assumes the same value $d_b$=d across all the symbols 110. And for format 2, the output may be 5 $\hat{d}$ values in each slot as each slot in LTE comprises of 5 data symbols.

In conventional LTE communication, the transmitted signal over a set of resource blocks is a Zadaoff-Chu sequence multiplied by the exponential sequence indexed by the cyclic shift that is periodic over one resource block. Since the number of subcarriers in one resource block is 12, the number of cyclic shifts that may be provided for plurality of users over one resource block may be 12 cyclic shifts. The consequence of such a configuration is that, the number of users that can be accommodated over a resource block at a given instant of time is only 12 orthogonal users. That is to say, since only 12 cyclic shifts are available over one resource block, then the number of cyclic shifts that may be provided for plurality of users is 12 cyclic shifts. Hence the maximum number of users may be 12. Further, the same users may be utilizing the set of resource block for transmitting the signal. As an example, if 50 resource blocks are available for signal transmission, then as per conventional LTE standards, all the 12 users may utilize all the available 50 resource blocks.

In view of the foregoing discussions, there is a need for a technical solution that can accommodate greater number of users in the uplink transmission as compared to the conventional LTE standards.

SUMMARY

In an embodiment, a method for accommodating users in an uplink channel is provided. The method comprises a processor for selecting a region of sub carriers in a frequency domain, wherein a channel value of a plurality of users over the selected region varies gradually. The processor is further configured to select the sub carriers within the selected region of sub carriers by skipping the sub carriers by an integer value which is 0 or more than 0. Either a product of a known sequence and an exponential sequence is transmitting over the selected sub carriers for channel estimation or the product of the known sequence and the exponential sequence and a data value may be transmitted for data detection, wherein the exponential sequence is characterized by a cyclic shift value. Further, a base station is configured to perform channel estimation of the users using the received selected sub carriers within the selected region and the processor is also configured to perform data detection for the users over the selected sub carriers using the estimated channel value.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

Figure 1B:
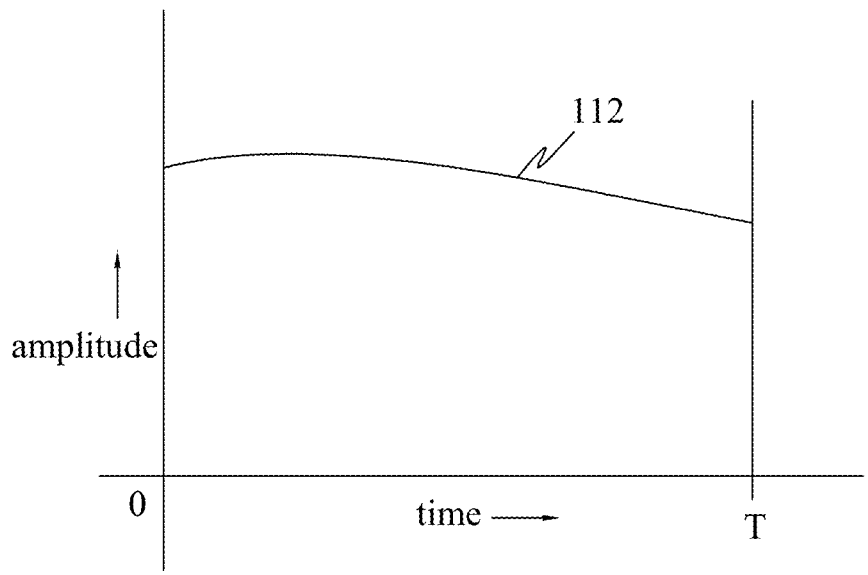
FIG. 1B is a prior art graphical time domain representation of a slowly varying signal x(t) 112.
Figure 1C:
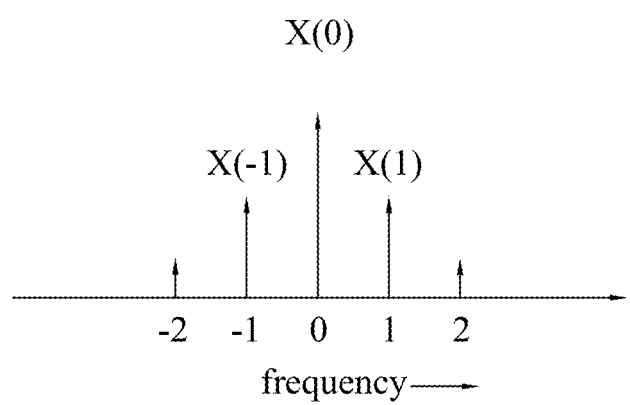
FIG. 1C is a prior art graphical frequency domain representation of the slowly varying signal.
Figure 1D:
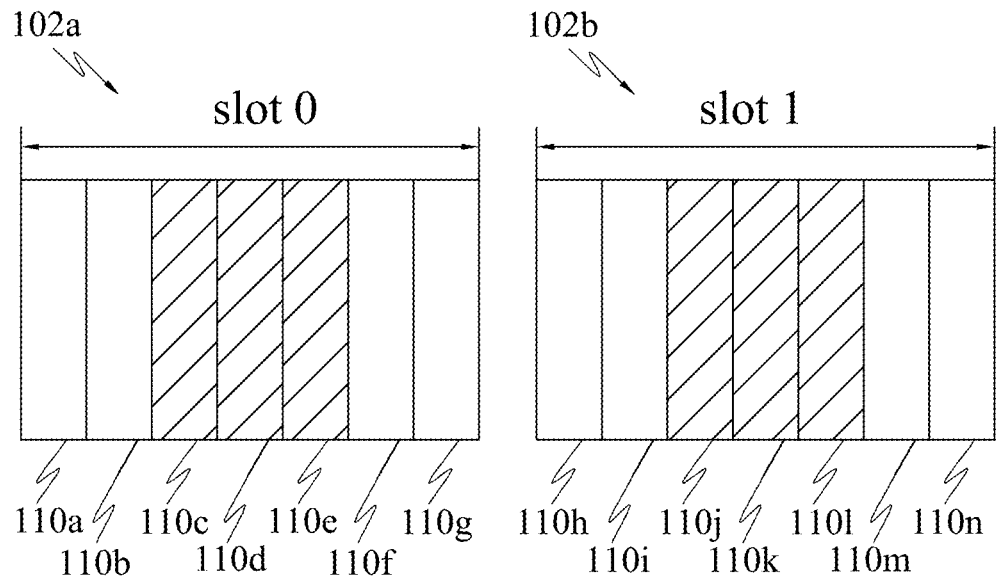
FIG. 1A is a prior art representation of an LTE frame (type 1) structure.
Figure 1E:
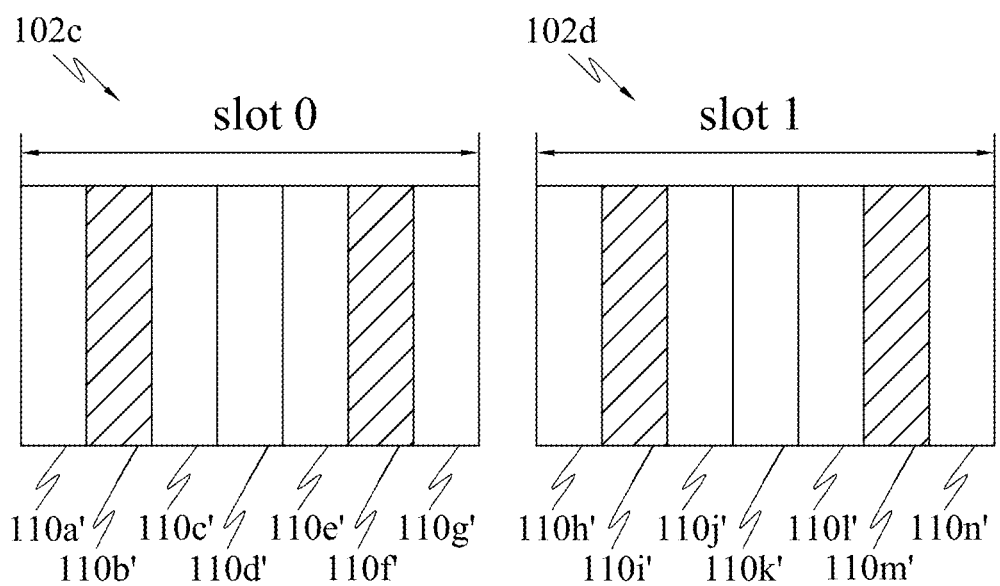
Figure 1F:
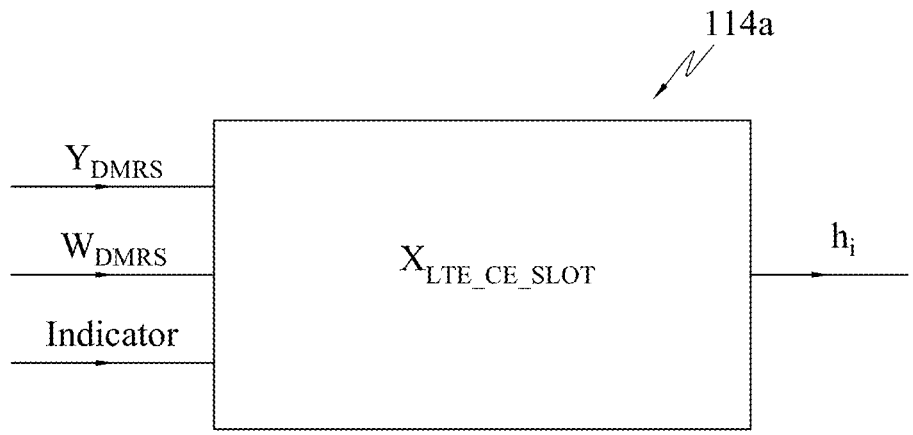
Figure 1G:
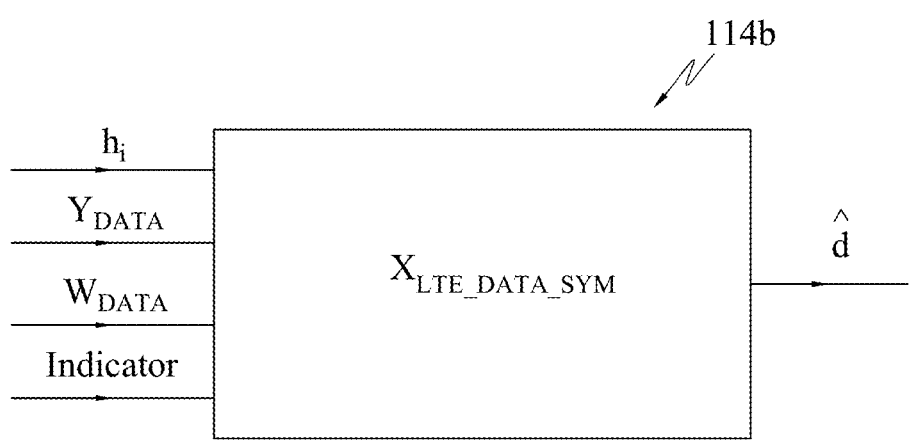
Figure 2:
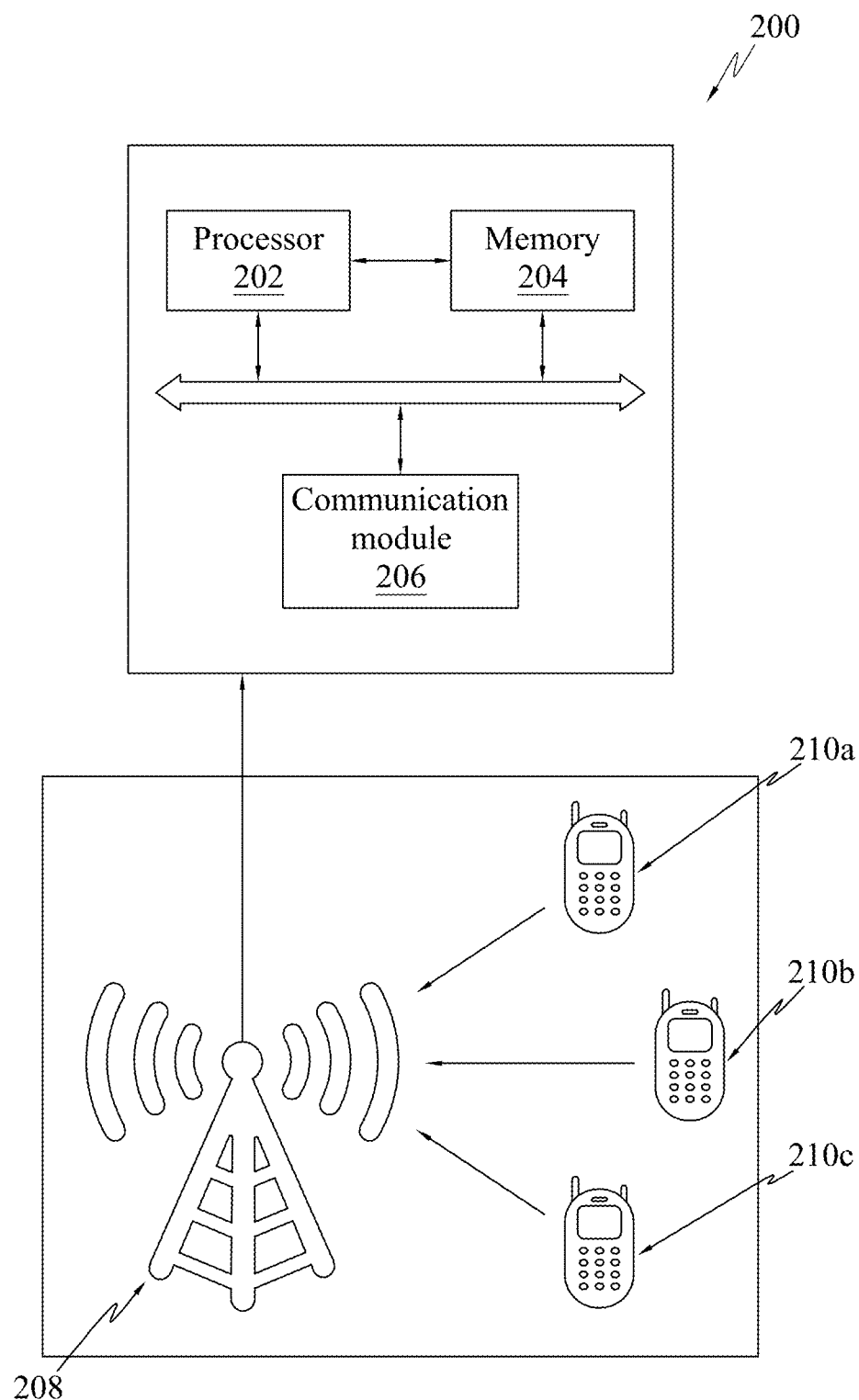
Figure 3A:
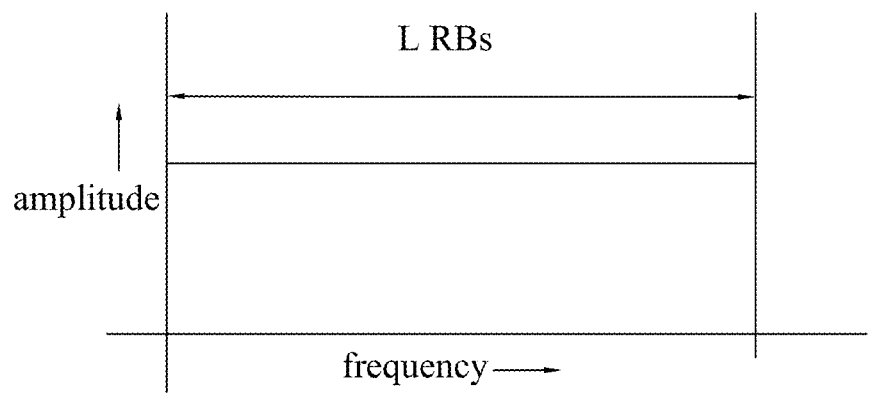
Figure 3B:
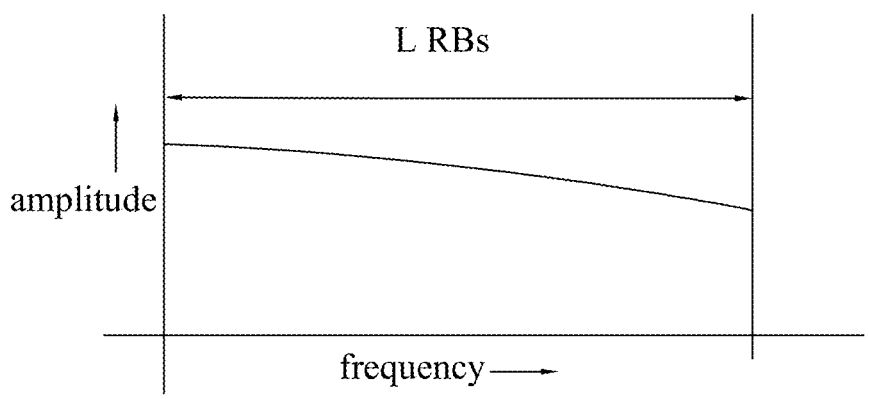
Figure 3C:
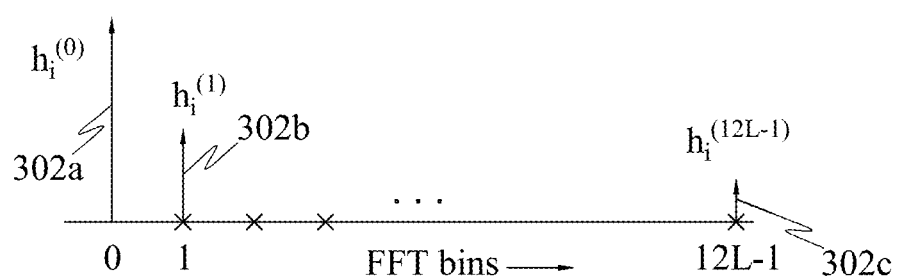
Figure 4A:
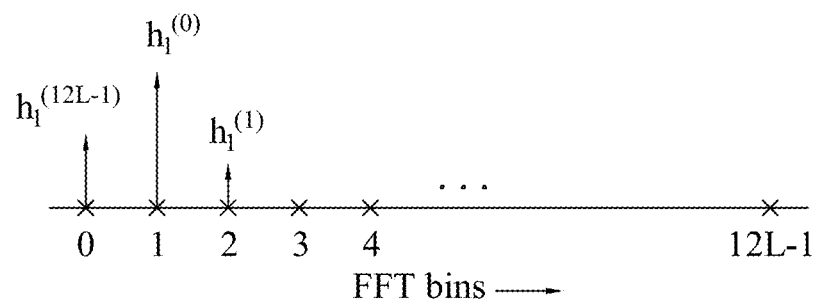
Figure 4B:
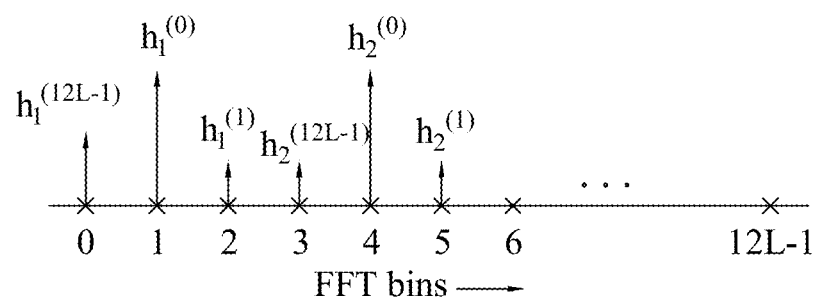
Figure 5A:
Figure 5B:
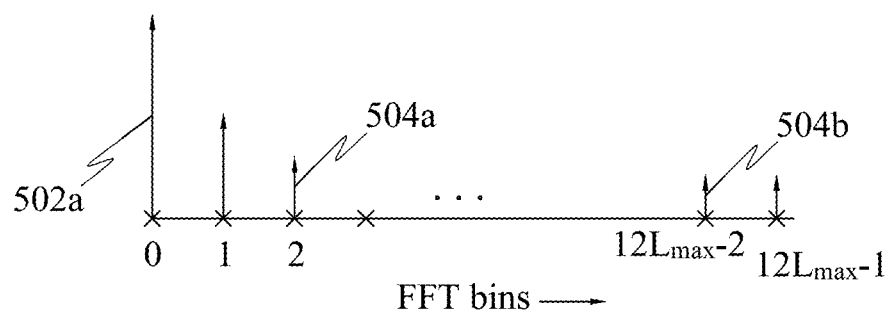
Figure 6A:
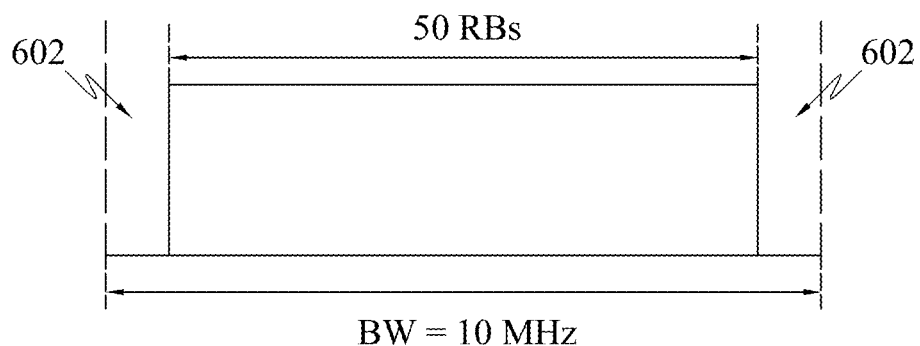
Figure 6B:
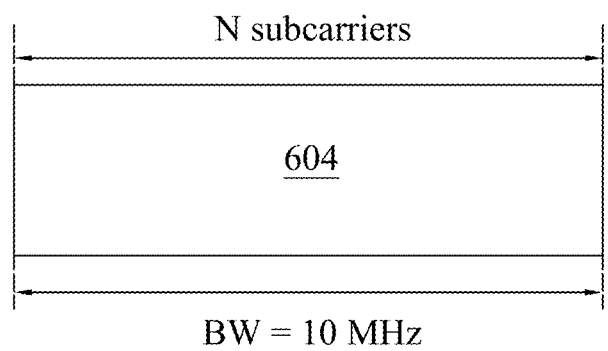
Figure 7A:
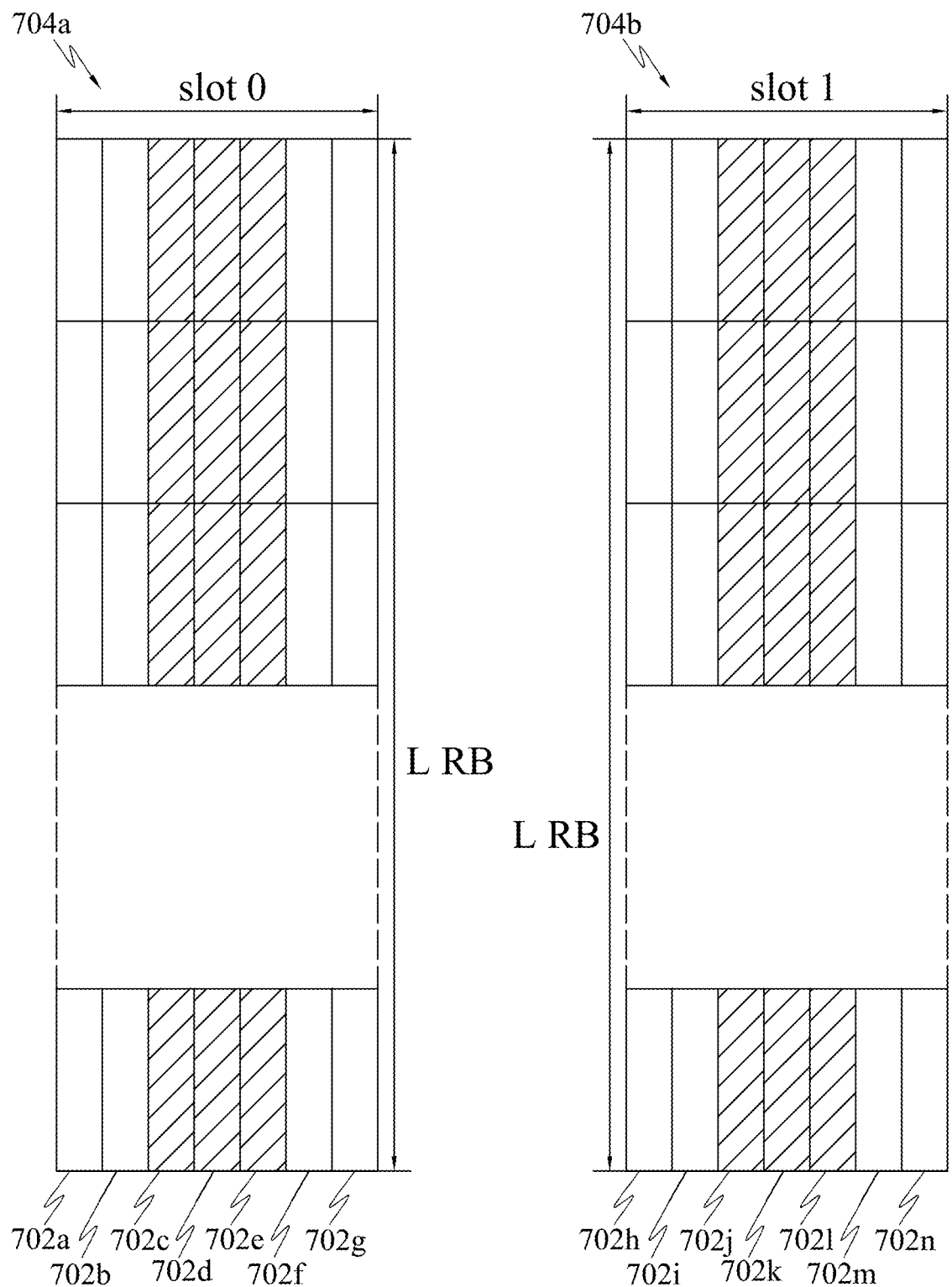
Figure 7B:
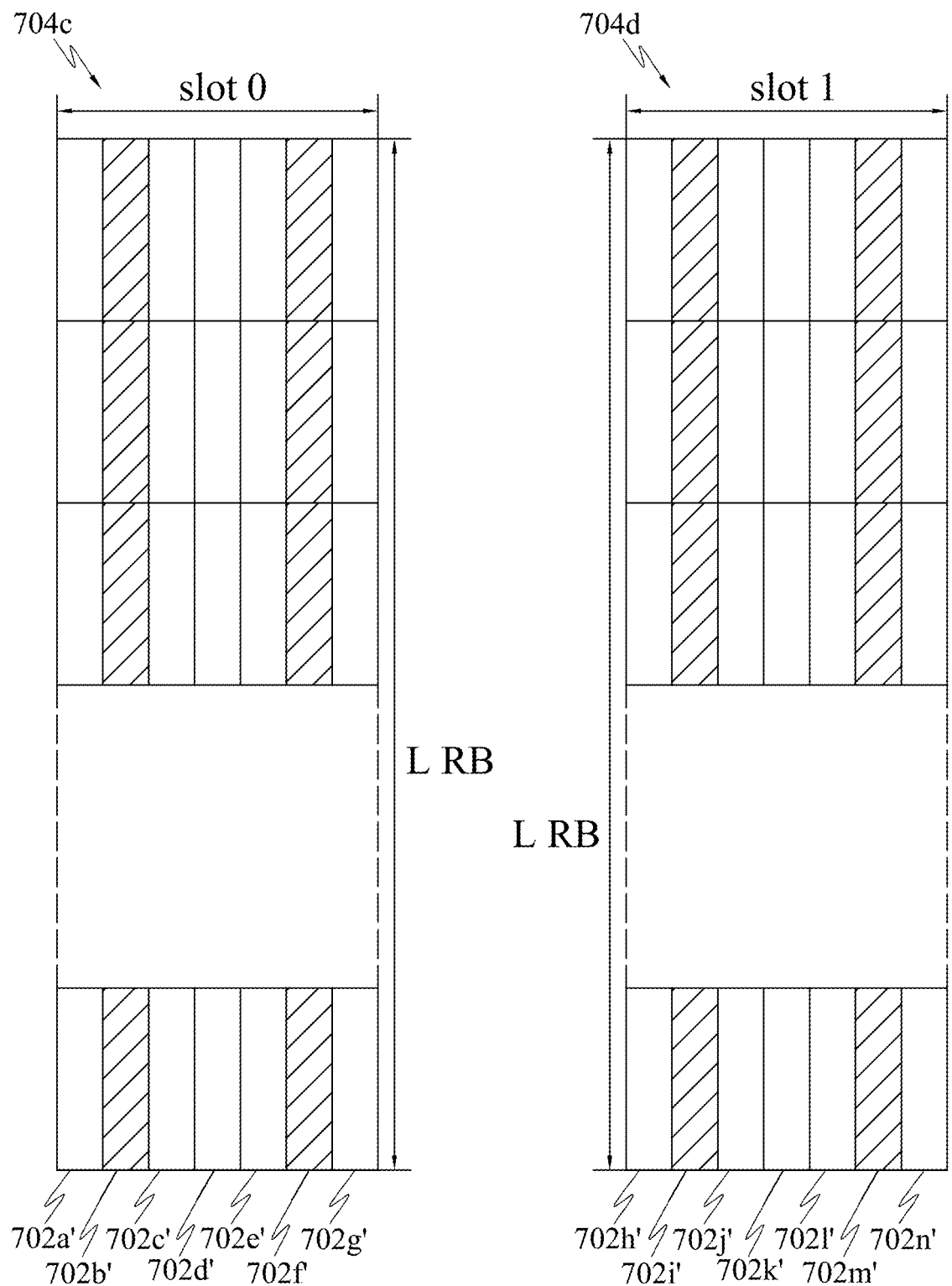
Figure 8A:
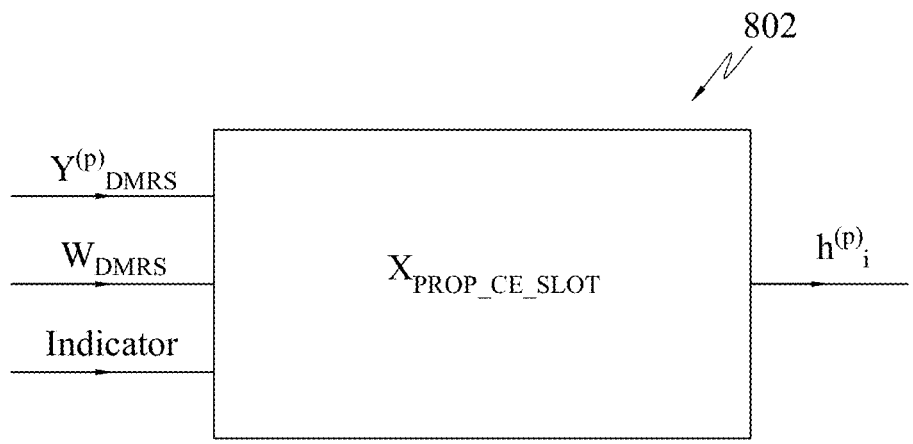
Figure 8B:
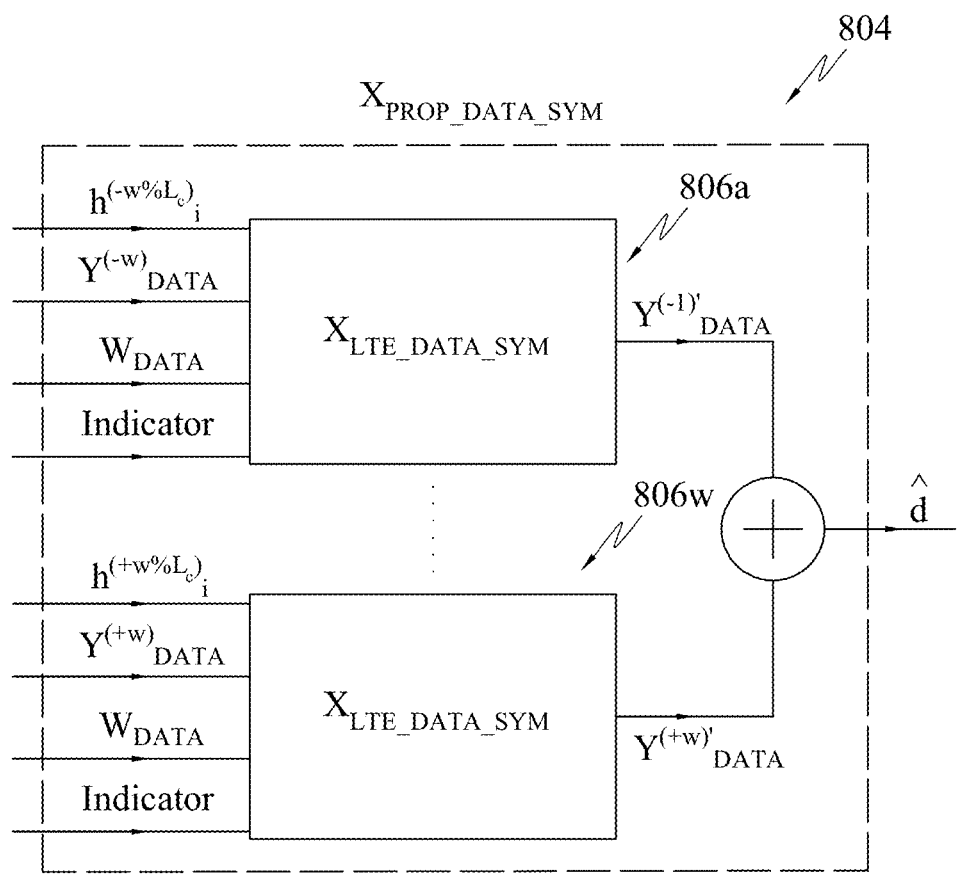
Figure 9:
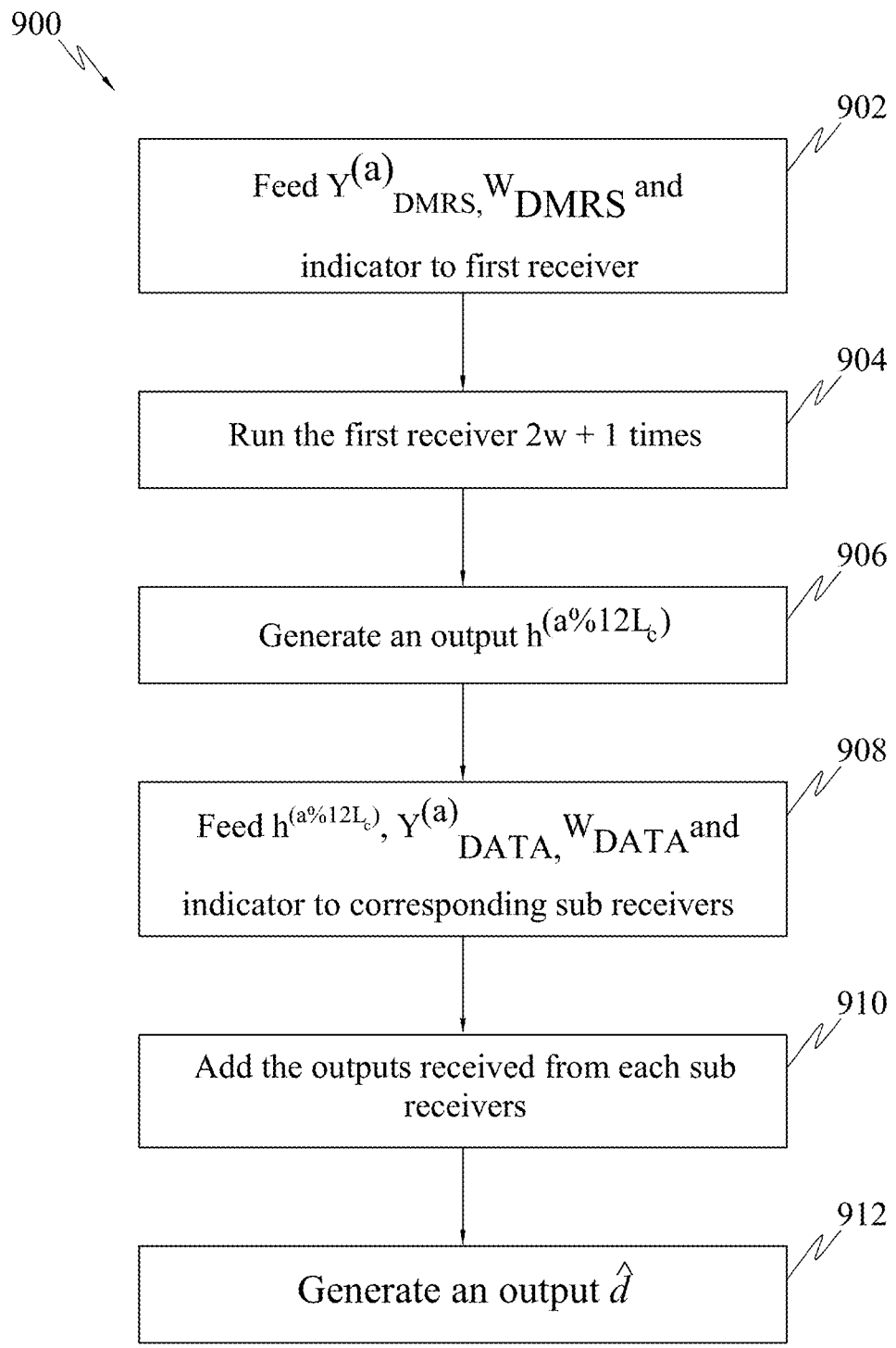
Figure 10:
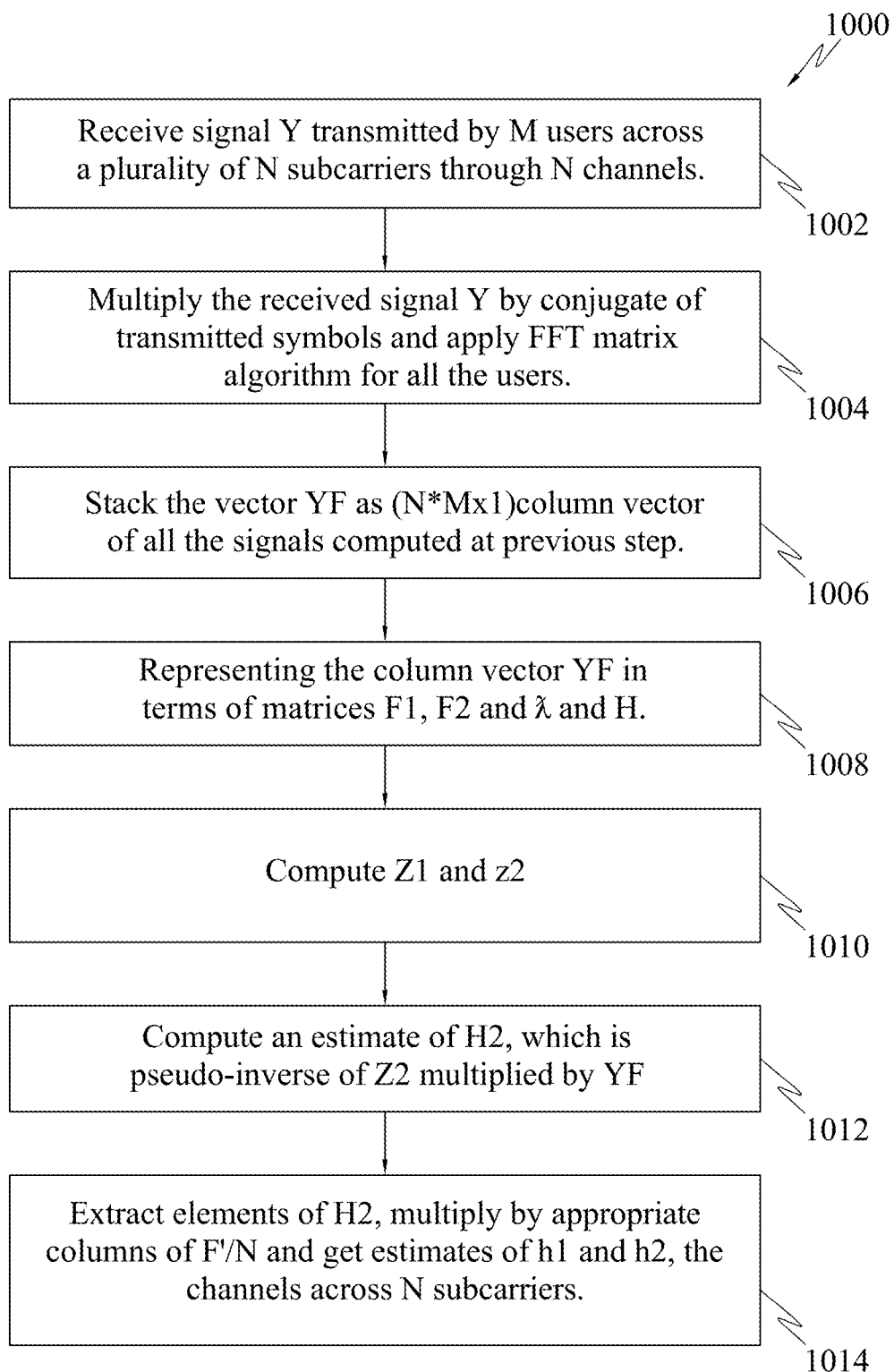
Figure 11:
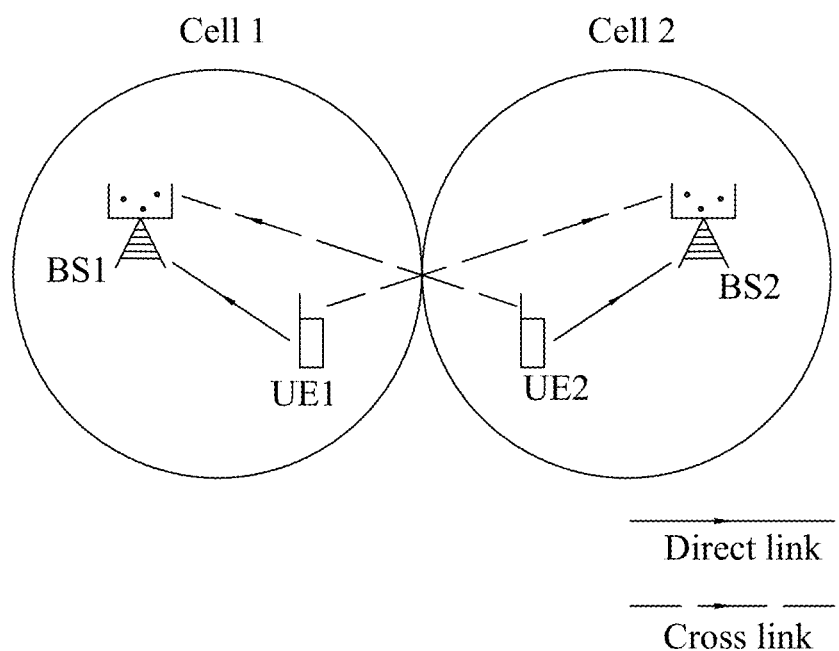
Figure 12:
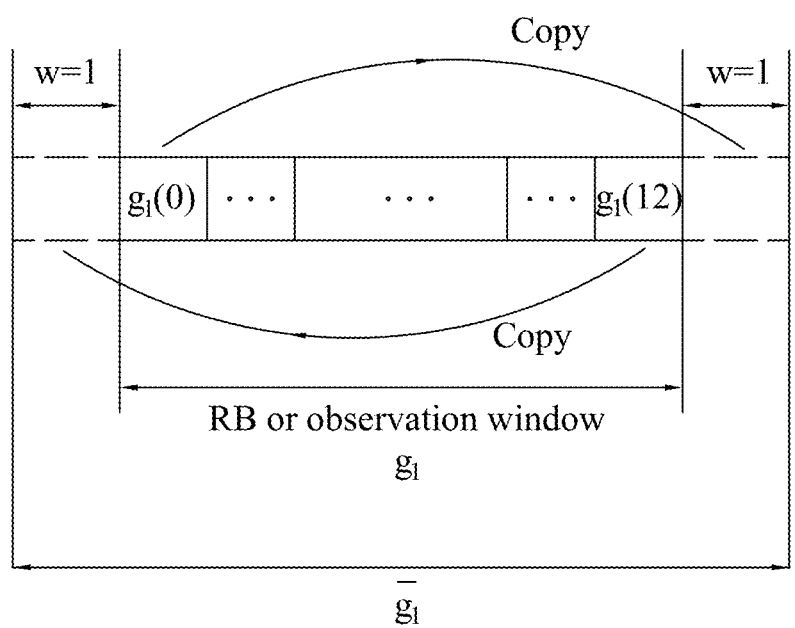
Figure 13:
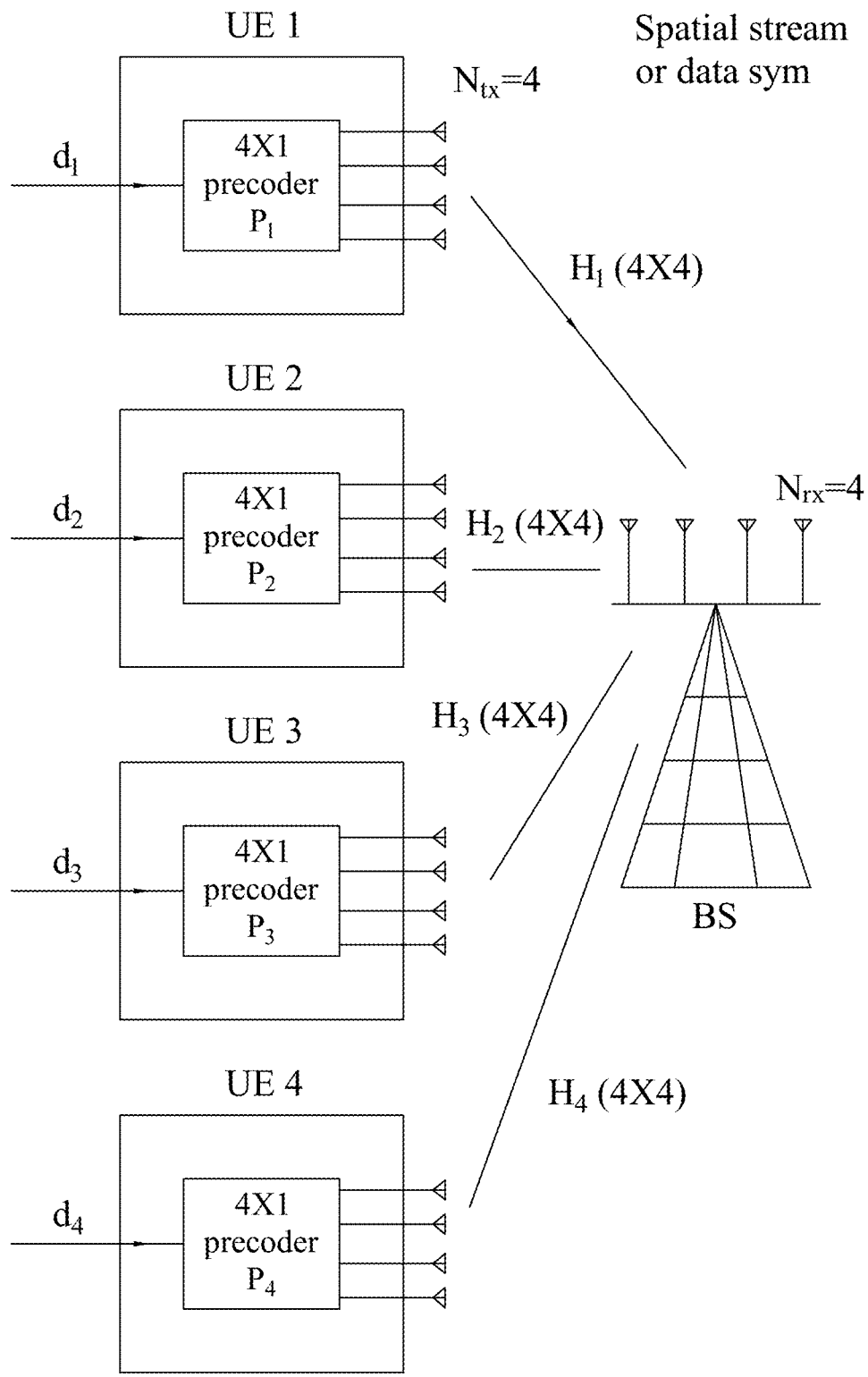

FIG. 1D is a prior art schematic representation of 2 slots; slot 0 102a and slot 1 102b of format 1 of PUCCH;

FIG. 1E is a prior art schematic representation of 2 slots; slot 0 102c and slot 1 102d of format 2 of PUCCH;

FIG. 1F is a prior art schematic representation of a first LTE receiver $X_{LTE\_CE\_SLOT}$ 114a;

FIG. 1G is prior art a schematic representation of a second LTE receiver $X_{LTE\_DATA\_SYM}$ 114b;

FIG. 2 is an exemplary architecture of an exemplary system 200 for accommodating more number of users over L resource blocks in an uplink transmission, in accordance with an embodiment;

FIG. 3A is a graphical frequency domain representation of channel $h_i$ of $UE_i$, wherein $h_i$ is constant over L resource blocks, in accordance with an embodiment;

FIG. 3B is a graphical frequency domain representation of a channel signal $h_i$ experienced by $UE_i$ across L resource blocks, in accordance with an embodiment;

FIG. 3C is a graphical representation of the FFT of the channel signal $h_i$ experienced by $UE_i$, in accordance with an embodiment;

FIG. 4A is an FFT of a received signal 'y' received from user 1, in accordance with an embodiment;

FIG. 4B is an FFT of the received signal 'y' received from user 1 and user 2, in accordance with an embodiment;

FIG. 5A is a representation of FFT of channel coefficient $h_i$ over $L_{min}$ RB ($L_{min}$ resource blocks), in accordance with an embodiment;

FIG. 5B is a representation of FFT of channel coefficient hi over $L_{max}$ RB ($L_{max}$ resource blocks), in accordance with an embodiment;

FIG. 6A is a schematic representation of the LTE bandwidth with guard bands 602;

FIG. 6B is a schematic representation a data part of 'N' samples and a cyclic prefix part of L' samples in an OFDM (orthogonal frequency division Multiplex) symbol;

FIG. 7A is a schematic representation of 2 slots; slot 0 704a and slot 1 704b of format 1 of PUCCH over L resource blocks;

FIG. 7B is a schematic representation of 2 slots; slot 0 704a and slot 1 704b of format 2 of PUCCH over L resource blocks;

FIG. 8A is a schematic representation of a first receiver $X_{PROP\_CE\_SLOT}$ 802;

FIG. 8B is a schematic representation of a second receiver $X_{PROP\_DATA\_SYM}$ 804;

FIG. 9 is a flow chart illustrating a method for decoding a data value $d_b$;

FIG. 10 is a flowchart 1000 which illustrates an exemplary method to estimate the channel values of M users across N subcarriers;

FIG. 11 is a graphical representation of base station 208 in a cell configured to receive uplink signals from users in its own cell and user from other cells;

FIG. 12 is a representation of pilot pattern sequence that may be robust to timing and frequency synchronization errors;

FIG. 13 is a graphical representation of uplink multiuser MIMO scheme; and

Figure 14:
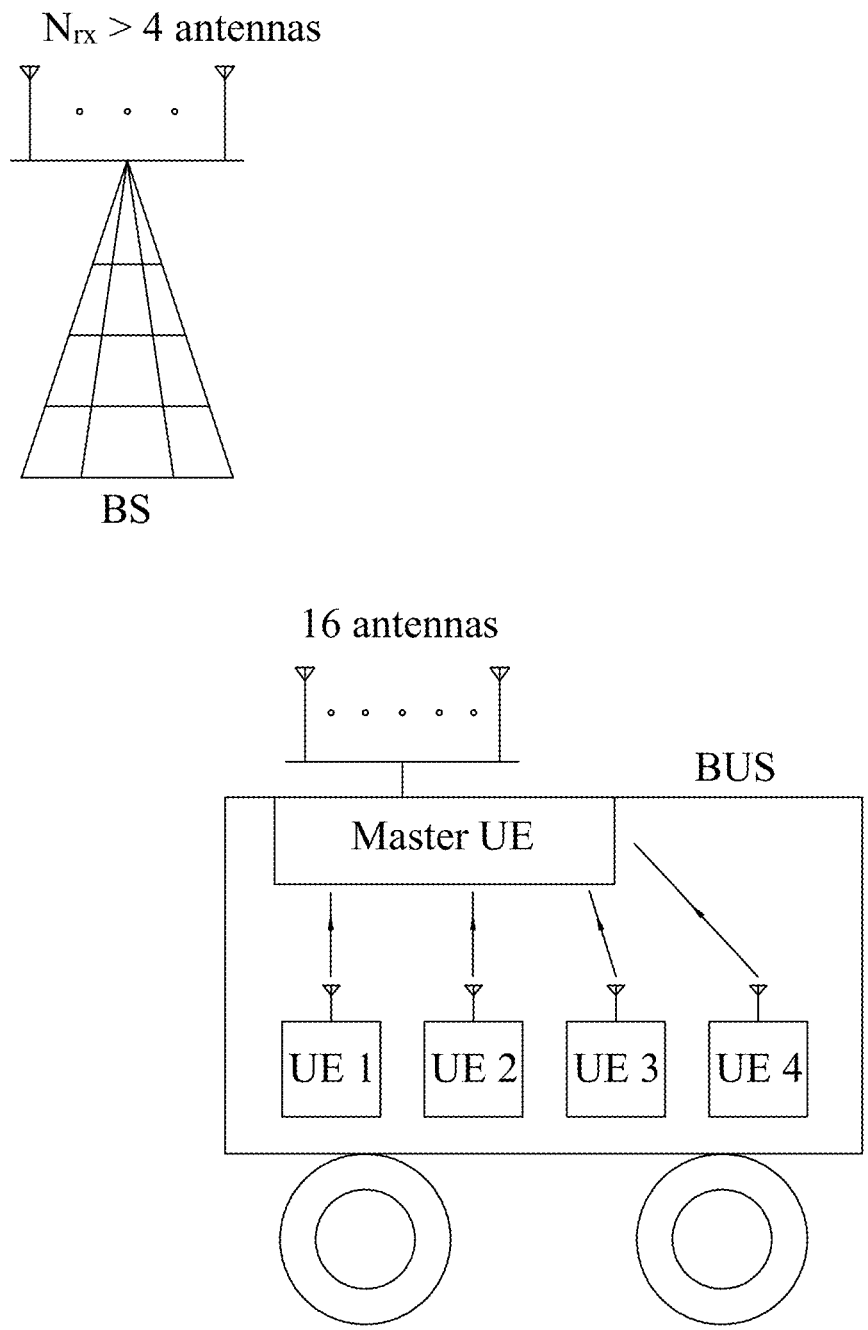

FIG. 14 is an exemplary graphical representation of the uplink multiuser MIMO scheme.

DETAILED DESCRIPTION

I. EXEMPLARY SYSTEM
II. ACCOMMODATING MORE USERS ACROSS L RESOURCE BLOCKS
III. DETERMINATION OF $L_{min}$ and $L_{max}$
IV. CHANNEL ESTIMATION
V. DECODING DATA VALUE FOR PUCCH
VI. PILOT PATTERNS TO MITIGATE ICI
VII. A NEW UPLINK MULTIUSER-MIMO SCHEME The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

I. EXEMPLARY SYSTEM

Referring to the figures, a system and method for accommodating more number of users over L resource blocks, wherein L is greater than 1, as compared to a conventional LTE standard in an uplink transmission is provided. FIG. 2 is an exemplary architecture of an exemplary system 200 for accommodating more number of users over L resource blocks. The system 200 includes, but not limited to, a processor 202, a memory unit 204 and a network communication module 206. The system 200 may be configured to communicate with a plurality of UEs (user equipment) 210a, 210b, 210c via the communication module 206. The system 200 may be configured in a base station 208. The number of resources blocks 'L' for accommodating more number of users is selected in such a way that L>1.

The processor 202 may be configured to receive a transmitted signal from the UEs 210a, 210b, 210c for estimating the channel coefficients 'h' for each of the UE 210a, 210b, 210c and various other functions as described in detail below. In an embodiment, processor 202 may include one or more processing units. Processor(s) may be implemented as appropriate in hardware, computer-executable instructions, firmware, or combinations thereof. Computer-executable instruction or firmware implementations of the processor 202 may include computer-executable or machine executable instructions written in any suitable programming language to perform the various functions described.

The memory units/devices 204 may store data and program instructions that are loadable and executable on processor(s) 202 as well as data generated during the execution of these programs. The memory unit 204 may be volatile, such as random-access memory and/or a disk drive or non-volatile memory. The memory unit 204 may comprise of removable memory such as a Compact Flash card, Memory Stick, Smart Media, Multimedia Card, Secure Digital memory, or any other memory storage that exists currently or may exist in the future.

The communication module 206 may interact with the plurality of the UEs 210a, 210b, 210c. The communication module 206 may be configured to receive the transmitted signal from the plurality of UEs 210a, 210b, 210c. The communication module 206 may be further configured to receive the processed data from the processor 202 and communicate aspects of the received data to the plurality of the UEs 210a, 210b, 210c. As an example, the processor 202 may estimate the channel coefficients 'h' across RBs for each of the UE 210a, 210b, 210c and the communication module 206 may communicate the channel coefficient to the respective UE's 210a, 210b, 210c. That is to say, the estimated channel coefficient $h_1$ may be transmitted to $UE_1$ 210a, $h_2$ may be transmitted to $UE_2$ 210b and so on.

II. ACCOMMODATING MORE USERS ACROSS L RESOURCE BLOCKS

Having discussed the architectural configuration of the system 200, the method for accommodating more number of users (UEs) over L resource blocks in the uplink transmission is discussed hereunder.

In an embodiment, referring to FIG. 2, the method for accommodating more number of users over L resource blocks in the uplink transmission may include the base station 208 and the plurality of users (UE 210a, 210b, 210c). Multiple users may be transmitting signal to the base station 208 on the same set of RBs (resource blocks) or subcarriers. The uplink subcarriers may be shared among multiple users transmitting signals at the same time. The signal may be transmitted over a set of L resource blocks. The signal transmitted by the plurality of users over L resource blocks may be a same known sequence (Zadoff-chu) sequence multiplied by an exponential that may be periodic or cyclic over L resource blocks. The exponential sequence (cyclic shift) may be represented as $$e^{\frac{j2\pi n_{cs} n}{12L}},$$

wherein '$n_{cs}$' is cyclic shift or cyclic shift value ($n_{cs}$=0, 1, 2, ... 12L−1), 'n' is an index of subcarriers (n=0, 1, 2, ... 12L−1) and 'L' is the number of resource blocks. For multiple users, using the L resource blocks for transmitting the signal, the Zadoff-chu sequence may be constant whereas the cyclic shift sequence may vary for each individual user. For accommodating more number of users, the system 200 may utilize cyclic shift that may be periodic over L resource blocks. Since 1 resource block may be configured to include 12 subcarriers, the cyclic shift may be periodic over 12L subcarriers. (As per conventional LTE standard, the cyclic shift is periodic over 1 resource block or 12 subcarriers). If 'u' number of users use 12L subcarriers or L resource blocks, then the number of cyclic shifts provided over L resource blocks may be 'u'. That is to say, each user may be provided with one cyclic shift for transmission of signal to the base station 208. The cyclic shifts may be calculated using the equation $$e^{\frac{j2\pi n_{cs} n}{12L}}.$$

From the equation, it can be concluded that the number of cyclic shifts over L resource blocks may be equal to 12L. Hence, theoretically, the number of users that may be accommodated over L resource blocks may be 12L.

In an embodiment, the processor 202 configured in the base station 208 may be configured to receive the uplink signal or data, transmitted by the $UE_i$, ($i^{th}$ user or user i) through a channel $h_i$. That is to say, $UE_1$ 210a may experience $h_1$, $UE_2$ 210b may experience $h_2$ and $UE_i$ may experience $h_i$ while transmitting the uplink signal to the base station 208. The channel 'h' is due to a wireless air medium through which the signal or data flows across the UE 210a, 210b, 210c and the base station 208. The coefficient of the channel $h_i$ may be constant across a single resource block but may vary gradually across L resource blocks. That is to say, the channel coefficient 'h' may be constant over the first resource block but may change for the second resource block. The channel coefficient may be constant for the second resource block but may change for the third resource block and so on. The change of channel coefficient 'h' across plurality of resource blocks may be very gradual.

FIG. 3A is a graphical frequency domain representation of channel $h_i$ of $UE_i$ (user i), when channel $h_i$ is constant over L resource blocks. FIG. 3B is a graphical frequency domain representation of the channel $h_i$, when the channel $h_i$ gradually varies over L resource blocks.

In an embodiment, if the channel coefficient 'h' was constant over L resource blocks, then all the cyclic shifts available over L resource blocks may be provided to the plurality of users. As the channel coefficient 'h' is gradually varying over L resource blocks, providing all the cyclic shifts available over L resource blocks for the plurality of users may cause interference between the signals transmitted by the plurality of users. For reducing the signal interference, number of cyclic shifts provided to the plurality of users may be less than the number of cyclic shifts available over L resource blocks. That is to say, some of the cyclic shifts may be skipped while providing the cyclic shifts for the plurality of users. As an example, the zeroth, third, sixth and so on cyclic shifts may be considered. That is to say, 2 cyclic shifts may be skipped in between every provided cyclic shifts.

In an embodiment, the number of cyclic shifts that may be considered or the number of cyclic shifts that may be skipped, for reducing the signal interference, over L resource blocks may be calculated as described below.

FIG. 3B is the frequency domain representation of the slowly varying channel signal $h_i$ corresponding to signal $S_i$ transmitted by the $UE_i$. The x-axis of the frequency domain graph of the channel $h_i$ correspond to frequency or subcarriers and the y axis of the frequency domain graph corresponds to amplitude. The frequency domain graph may represent the gradual variation of the channel $h_i$ over frequency or subcarriers. A Fast Fourier Transformation (FFT) may be applied on the slowly varying channel $h_i$. The corresponding FFT of the channel $h_i$ is depicted in FIG. 3C.

The x-axis of the graph in FIG. 3C corresponds to the FFT bins and the y-axis of the graph in FIG. 3C, corresponds to the amplitude.

The FFT of the channel $h_i$ may comprise of plurality of bins 302a, 302b, 302c, as depicted in FIG. 3C. For calculating the number of cyclic shifts, only the bins whose value is equal to or greater than P % of the largest bin 302a may be considered. Generally, the largest bin 302a is the bin with maximum amplitude. The largest bin 302a corresponds to the cyclic shift value $n_{cs}$ provided to the user. That is to say, if the user 'i' is provided with the cyclic shift value $n_{cs}$, then the largest bin 302a of the FFT of the channel $h_i$ may correspond to the cyclic shift value $n_{cs}$. Hence, the bins whose value is equal to or greater than P % of the $n_{cs}^{th}$ FFT bin may be considered. The value of P may be a small value generally. As an example, the value of P may be 5, 10 and so on. The number of bins that may be present may depend on the variation of the channel $h_i$ across the resource blocks and L. As an example, for a constant channel (FIG. 3A), the number of bins may be 1. For a channel with large variation across resource blocks, the number of bins may be greater than three. For a varying channel $h_i$, the minimum number of bins that may occupy the FFT of $h_i$ may be 3. The variation of the channel may be dependent on the geographical area of the transmission of the signal. That is to say, the variation of the channel $h_i$ across the resource blocks may be different in an urban area as compared to a suburban or a rural area. For the urban area, the variation of the channel $h_i$ may be faster as compared to the suburban and the rural area. Further, the variation of the channel $h_i$ may be faster for a macro cell as compared to the variation of $h_i$ in a small cell (cells may be geographical areas covered by cellular radio antennas, wherein, the small cells cover indoor areas (areas≤200 m) and the macro cells cover outdoor areas (areas≥200 m)). Furthermore, the variation of channel $h_i$ across the resource blocks may be different across different LTE channel models such as ETU (Extended Typical Urban model), EVA (Extended Vehicular A model) and EPA (Extended Pedestrian A model).

Referring to FIG. 3C, the FFT of the channel $h_i$ may occupy 'x' bins. As an example, the FFT of the channel $h_i$ of FIG. 3B may occupy 3 bins. The first bin may correspond to $h_i^{(0)}$, the second bin may correspond to $h_i^{(1)}$ and the third bin may correspond to $h_i^{(12L-1)}$, wherein 'i' represents the 'i$^{th}$' user and 0, 1 and 12L-1 represents the bin number. As an example, $h_1^{(0)}$ is the value of FFT of $h_1$ (channel of user 1) in the 0$^{th}$ bin, $h_1^{(1)}$ is the value of FFT of $h_1$ in the 1$^{st}$ bin and so on. Since the number of bins is 'x', the number of cyclic shifts that may skipped may be 'x−1'. That is to say, every third cyclic shift maybe provided to the plurality of users. As an example, if the number of bins occupying the frequency domain is 3 ('x'), then the number of cyclic shifts that may be skipped is 2 ('x−1'). That is to say, the zeroth, third, sixth . . . cyclic shift may be provided to the plurality of users for the transmission of the uplink signal.

The number of users to be accommodated over L resource blocks may be dependent on the number of cyclic shifts provided to the plurality of users (UEs). As an example, if the cyclic shift is periodic over L resource blocks, then the number of cyclic shifts that may be provided to the plurality of users may be 12L (12 subcarriers×L resource blocks). In such a case, the maximum number of users that can be accommodated over L resource blocks may be 12L users (if 'h' is constant over L resource blocks). Practically, such a scenario is not possible as all the cyclic shifts may not be provided to the plurality of users. Hence, the number of users may be less than 12L.

The number of users may be determined from the number of cyclic shifts, a nearest neighbour value 'w' and L resource blocks, wherein all the nearest neighbour values 'w' may be greater than P % of the largest bin. Referring to FIG. 3C, consider the largest bin 302a. The nearest neighbour value 'w' may be the number of nearest bins on the left 302c and right 302b of the largest bin 302a. The nearest neighbour value 'w' may change depending on geographical location such as the urban, the rural and so on and whether it is the macro cell or the small cell. In FIG. 3C, the number of bins on the left side and right side of largest bin may be 1. That is to say w=1. Referring to FIG. 5B, when the number of bins is 5, then 'w' may be 2. When the number of bins is 3, 5, 7 . . . then the nearest neighbour value may be 1, 2, 3 . . . respectively. The relation between the number of bins 'x' and the nearest neighbour value 'w' may be represented as number of bins x=2w+1. Further, the relation between the number of cyclic shifts that may be skipped, and the nearest neighbour value 'w' may be represented as the number of cyclic shifts skipped=2w. That is to say, cyclic shifts between two users may differ by 2w.

In an embodiment, the number of users 'u' that may be accommodated over L resource blocks can be determined using a mathematical expression;

$$u = \frac{KL}{2w+1} \quad (3)$$

wherein 'KL' represents the number of subcarriers that may be used for transmitting the signal. For PUSCH and PUCCH transmission K=12 is the number of subcarriers per resource block and $L=L_c$ is the number of resource blocks. For SRS transmission, K=8 and $L=L_{SRS}$; and 'w' represents the nearest neighbour value.

As an example, let the number of resource blocks be 4 (L=4), then the number of cyclic shifts may be 48. If 2 cyclic shifts may be skipped, then the nearest neighbour value 'w'=1. If 12 subcarriers may be used for the transmission of the signal, then K=12. Hence, the maximum number of users that may be accommodated over 4 resource blocks may be 16.

As per the conventional LTE standards, maximum number of users may be 12. In an embodiment, as per the above example, the number of users may be 16.

The above described method for calculating the number of user's 'u' may be based on determining the nearest neighbour value 'w' by applying the Fast Fourier transformation on the slowly varying channel 'h' across L resource blocks. The signal '$S_i$' that may be transmitted by the $UE_i$, the channel coefficient $h_i$ may not be known at the time of the signal transmission. Since the channel coefficient $h_i$ is not estimated at the time of the signal transmission, practically it may not be possible to apply FFT for channel $h_i$. Therefore, the FFT may be applied on the received signal 'y' (signal received at the base station 208 over L RBs), wherein $y = \sum_{i=1}^{i=u}(S_i \circ h_i)$ all in frequency domain (RBs), which is described in detail below. The determination of the number of users to be accommodated over L resource block by applying FFT to the signal 'y' is described in detail below with an example, wherein the number of bins is 3.

Consider the signal $S_1 = f_1$ transmitted by the user 1 ($UE_1$). $f_0$ is 1$^{st}$ column of an A×A IFFT matrix 'F', wherein (i,j)$^{th}$ element of the matrix corresponds to $$(1/A)e^{\frac{j2\pi(i-1)(j-1)}{A}}$$

and $1 < i, j < 12L$ and '$A$'$=12L$ is the number of subcarriers in the uplink transmission. The $i^{th}$ column of F may correspond to $f_{i-1}$. We define $f'_i = A f_i$. The signal received at the base station 208 may be $y=(h_i \circ f'_1)$, wherein $h_i$ is the channel through which the signal $f'_1$ is transmitted to the base station 208, $f'_1$ is the signal transmitted across 12L subcarriers and '$\circ$' is the Hadamard product of element wise multiplication of two matrixes $h_i$ and $f'_1$. Since $f_1$ and $h_1$ may be transmitted across 12L subcarriers, $f'_1$ and $h_1$ may be a 12L×1 matrix. For determining the number of users that may be accommodated over L resource blocks, FFT may be applied to the received signal 'y'. The received signal 'y' after applying FFT is depicted in FIG. 4A. Referring to FIG. 4A, the FFT of the signal 'y' may occupy 3 bins. (As discussed above, the number of bins may be dependent on the geographical area and L resource blocks.) The 3 bins may occupy $0^{th}$, $1^{st}$ and $2^{nd}$ bin points, wherein the corresponding values of channel coefficient may be $h_1^{(12L-1)}$, $h_1^{(0)}$ and $h_1^{(2)}$.

FIG. 4B is the FFT of signal 'y' when 2 users may be transmitting the uplink signal to the base station 208. The first user may transmit a signal $S_i = f'_1$ through the channel $h_1$ and the second user may transmit a signal $S_2 = f'_4$ through the channel $h_2$. The user 2 may be transmitting signal $f'_4$, as the number of cyclic shifts skipped is 2. Referring to FIG. 4B, the nearest neighbour value 'w' for the largest bins $h_1^{(0)}$ and $h_2^{(0)}$ may be 1. Then the number of users 'u' that may be accommodated over L resource blocks can be determined using the mathematical expression;

$$u = \frac{KL}{2w+1} \quad (4)$$

wherein 'KL' represents the number of subcarriers that may be used for transmitting the signal. For PUSCH and PUCCH transmission K=12 is the number of subcarriers per resource block and $L=L_c$ is the number of resource blocks. For SRS transmission, K=8 and $L=L_{SRS}$; and 'w' represents the nearest neighbour value.

In the example provided above, since the nearest neighbour value 'w' is 1, the number of users that may be accommodated over L resource blocks is $$u = \frac{KL}{3}.$$

In an embodiment, when PUCCH (Physical Uplink Control Channel) or PUSCH (Physical Uplink Shared Channel) may be used for the transmission of information, the information may be transmitted over all the $12L_c$ subcarriers of resource blocks. Then the value of 'K' in equation (3) is 12 and thus the equation (3) may be represented as $u=12L_c/(2w+1)$, wherein $L_c$ is the number of resource blocks. That is to say, when the information is transmitted across the PUCCH and PUSCH channels, then the number of users may be $u=12L_c/(2w+1)$. As an example, let the number of resource blocks be 4 (L=4), then the number of cyclic shifts may be 48. If 2 cyclic shifts may be skipped, then the nearest neighbour value 'w'=1. If 12 subcarriers may be used for the transmission of the signal, then K=12. Hence, the maximum number of users that may be accommodated over 4 resource blocks may be 16.

In another embodiment, when SRS (Sounding Reference Signal) may be transmitted by the uplink users, then the SRS signal is transmitted over alternative subcarriers. The number of subcarriers of the SRS framework per user may be $16L_{SRS}$. During SRS transmission, all the $16L_{SRS}$ subcarriers may not be configured to carry the information. The information may be carried by the alternative subcarriers. That is to say, the number of subcarriers configured to transmit the signal may be $8L_{SRS}$ (16/2). Therefore, the value 'K' in SRS transmission is 8 and thus the equation may be represented as $$u = \frac{8L_{SRS}}{2w+1},$$

wherein $L_{SRS}$ is greater than 1. As an example, let the number of $L_{SRS}$ be 3, then the number of cyclic shifts may be 24. If 2 cyclic shifts may be skipped, then the nearest neighbour value 'w'=1. If 8 subcarriers are used for the transmission of the signal, then K=8. Hence, the maximum number of users that may be accommodated over 4 resource blocks may be 8.

In an embodiment, table 1 provided below represents the number of users that may be accommodated for ETA, EVA and EPA channel for L=50 resource blocks. Since the variation of channel $h_i$ across the resource blocks may be different across different LTE channel models (ETA, EVA and EPA), the value of the nearest neighbour value 'w' may also vary for the different LTE channel models. Further, based on the value of the nearest neighbour value 'w', the number of users may change accordingly.

TABLE 1

| LTE channel model | Nearest neighbour value 'w' | Number of users |
|---|---|---|
| ETU | 25 | 12 |
| EVA | 10 | 29 |
| EPA | 3 | 86 |

Referring to FIG. 6A, for the uplink transmission, the entire bandwidth may not be occupied. As an example, consider the LTE bandwidth of 10 M Hz. The 50 resource blocks (50×12=600 subcarriers) that may be used for the transmission may be positioned in the middle of the entire bandwidth. An unused part or guard bands 602 positioned on the left and right of the 50 resource blocks may not be used for transmission. The guard band 602 ensures that the simultaneously used communication channels may not experience any interference that may result in decreased quality for transmission.

In an embodiment, an OFDM (Orthogonal Frequency Division Multiplex) symbol transmitted in the uplink transmission may comprise of 2 parts; a data part of 'N' samples and a cyclic prefix part of L' samples. Referring to FIG. 6B, the number of subcarriers spaced across the entire bandwidth 604 may be 'N'. That is to say, the entire bandwidth 604 may be occupied (the guard band may be absent). The FFT of the channel 'h' across the entire bandwidth may generate 'x=L' FFT bins. That is to say '2w+1=L'. Hence from equation (4), the number of users that may be accommodated over L resource blocks may be determined using the mathematical expression;

$$u = \frac{N}{L} \qquad (4a)$$

III. DETERMINATION OF $L_{min}$ and $L_{max}$

Having discussed the method for accommodating more number of users (UEs) over L resource blocks in the uplink transmission, the method for determining $L_{min}$ and $L_{max}$ is discussed hereunder.

In an embodiment, $L_{min}$ is the minimum number of resource block for accommodating a given number of users and $L_{max}$ is the maximum number of resource blocks for accommodating the same number of users, without causing signal interference. Consider the signal $S_i$ transmitted over the channel $h_i$ by the $UE_i$. If FFT of channel coefficient $h_i$ occupy 'x' bins, then the minimum value $L_{min}$ may be such that an energy in a first nearest neighbour of the largest bin just begin to appear. For the minimum value $L=L_{min}$, the number of bins occupying the frequency domain may be 'x'. As an example, referring to FIG. 5A, on applying FFT to the channel coefficient $h_i$ of the given geographical area, the number of bins occupying the frequency domain may be 3, wherein bin occupying the $0^{th}$ bin is the largest bin 502a. The value of the $L_{min}$ may be equal to the value of L, when the energy in the first nearest neighbour 502b, 502c begins to appear. That is to say, $L_{min}=L$, when the energy in the $1^{st}$ 502b and $(12L_{min}-1)^{th}$ bin 502c start appearing. For the $L_{min}$ value, the number of bins may be equal to 3 ('x').

In an embodiment, the maximum value $L_{max}$ may be such that the energy in a second nearest neighbour 504a, 504b of the largest bin 502a begin to appear. For the maximum value $L_{max}$, the number of bins may be 'x+2'. As an example, referring to FIG. 5B, as the value of L resource block may be increased, then at a particular value of L, energy may start appearing at $2^{nd}$ and $(12L_{max}-2)^{th}$ bins (second nearest neighbours 504a, 504b). This value of L, when the energy start appearing at $2^{nd}$ bin 504a and $(12L_{max}-2)^{th}$ bin 504b, is the $L_{max}$ value. For the $L_{max}$ value, the number of bins may be equal to 5 (x+2).

IV. CHANNEL ESTIMATION

Having discussed the method for determining $L_{min}$ and $L_{max}$, method for estimating channel for the plurality of users, wherein the known sequence transmitted is same for all the users is discussed hereunder.

The signal received at the base station 208 may be the sum of signals transmitted by plurality of users. That is to say, the signal received at the base station 208 may be the sum of signals transmitted by 'u' users across 12L subcarriers.

Consider the signals $S_1, S_2, S_3, \ldots S_i$ transmitted by the user 1 ($UE_1$), user 2 ($UE_2$), user 3 ($UE_3$) ... user i ($UE_i$) across 12L subcarriers, then the processor 202 may be configured to receive the signal 'y' at the base station 208. The received signal 'y' may be represented as;

$$y = \Sigma_{i=1}^{i=u}(Si \circ hi) \qquad (5)$$

wherein, 'y' is a 12L×1 vector of the received signal,

'$S_i$' is the 12L×1 vector of the transmitted signal by the $i^{th}$ user across 12L subcarriers, '$h_i$' is the 12L×1 vector of the channel corresponding to the $i^{th}$ user and '∘' is the Hadamard product or element wise matrix multiplication of $S_i$ and $h_i$, Referring to FIG. 2, consider the user i, transmitting the signal $S_i$ to the base station 208. The signal $S_i$ may be transmitted through the channel $h_i$ over 12L subcarriers. The processor 202 may be configured to estimate the channel coefficient $h_i$, wherein the channel coefficient $h_i$ may be represented as;

$$h_i \approx h_i^{(0)} f_0 + h_i^{(1)} f_1 + h_i^{(12L-1)} f_{12L-1} + \ldots + h_i^{(z)} f_z \qquad (6)$$

wherein, $h_i^{(z)}$ is the value of the FFT of $h_i$ in the $Z^{th}$ bin.

The number of terms in the equation (6) may depend on the value of L and variation of the channel h. In other words, the equation (6) is dependent on the variation of the channel h across L resource blocks. That is to say, the number of terms in the equation (6) may be dependent on the number of FFT bins of signal 'y' when only one user is transmitted. Only the bins of a user whose value is equal to or greater than P % of the largest bin of that user may be considered.

As an example, referring to FIG. 4A, consider only 1 user, the user 1, transmitting the signal $S_1=f_1$ to the base station 208. The signal $S_1$ may be transmitted through the channel $h_1$ over 12L subcarriers. The FFT of the received signal 'y' generates 3 bins that may occupy the $0^{th}$, $1^{st}$ and $2^{nd}$ bin points, wherein the corresponding values may be $h_i^{(0)}$ in the $1^{st}$ bin, $h_1^{(1)}$ in the $2^{nd}$ bin and $h_1^{(12L-1)}$ in the $0^{th}$ bin. Then the equation (6) may be represented as $h_1 \approx h_1^{(0)} f_0 + h_1^{(1)} f_1 + h_1^{(12L-1)} f_{12L-1}$ for the user 1.

Considering yet another example, when FFT of y generates 5 bins, then the channel coefficient $h_1$ of user 1 may be represented as $h_1 \approx h_1^{(0)} f_0 + h_1^{(1)} f_1 + h_1^{(2)} f_2 + h_1^{(12L-2)} f_{12L-2} + h_1^{(12L-1)} f_{12L-1}$ and In conventional LTE method, during channel estimation only the first term $(h_i^{(0)} f_0)$ of equation (6) may be considered and the rest of the terms $(h_i^{(1)} f_1, h_i^{(12L-1)} f_{12L-1}, \ldots, h_i^{(z)} f_z)$ may not be taken into consideration. That is to say, the channel coefficient $h_i$ for the user i may be $h_i = h_i^{(0)} f_0$ as per conventional LTE methods. As an example, the channel coefficient $h_1$ of the user 1 may be $h_1 = h_1^{(0)} f_0$, the channel coefficient $h_2$ of the user 2 may be $h_2 = h_2^{(0)} f_0$ and so on.

In an embodiment, the processor 202 may be configured to consider all the terms of the equation (6) for channel estimation of the user i. That is to say, the channel coefficient $h_i$ for the user i may be $h_i = h_i \approx h_i^{(0)} f_0 + h_i^{(1)} f_1 + h_i^{(12L-1)} f_{12L-1} + \ldots + h_i^{(z)} f_z$ or some terms of the equation (6) may be considered depending on the channel. As an example, the channel coefficient $h_1$ of the user 1 may be $h_1 \approx h_1^{(0)} f_0 + h_1^{(1)} f + h_1^{(12L-1)} f_{12L-1}$ the channel coefficient $h_2$ of the user 2 may be $h_2 \approx h_2^{(0)} f_0 + h_2^{(1)} f_1 + h_2^{(12L-1)} f_{12L-1}$ and so on. Including all the terms for channel estimation improves the quality of the uplink transmission of the signal.

In an embodiment, consider the slowly varying channel $h_i$, the processor 202 may be configured to process 'y' by using an FFT matrix algorithm. When FFT may be applied to the received signal 'y', the number of bins of any single user may be 'x'. Energy of the bins of any user that is less than P % of the largest bin of that user may be not considered. As the number of bins per user is 'x', the cyclic shifts provided to the 'u' users may be skipped by 'x−1'. Then the signal transmitted by the user 1, user 2, user 3 and so on may be $S_1=f_1$, $S_2=f_{1+x}$, $S_3=f_{1+2x}$ and so on respectively. The received signal 'y' of equation (5) may be then represented as;

$$y = (h_1 \circ f'_1) + (h_2 \circ f'_{1+x}) + (h_3 \circ f'_{1+2x}) + \ldots \qquad (5a)$$

As an example, referring to FIG. 4A, the number of bins occupying the FFT of y is 3 (x=3). Hence the number of cyclic shifts that may be skipped is 2. The signal transmitted by the user 1 may be $S_1=f_1$ corresponding to which the received signal at the base station 208 may be $y=(h_1 \circ f_1)$. For the user 2, the signal transmitted by the user 2 may be $S_2=f_4$ corresponding to which the received signal at the base station 208 may be $y=(h_2 \circ f'_4)$. The third user may transmit the signal $S_3=f'_7$ corresponding to which the received signal may be $y=(h_3 \circ f'_7)$. Then the received signal 'y' at the base station 208 for the plurality of users may be represented as;

$$y=(h_1 \circ f_1)+(h_2 \circ f'_4)+(h_3 \circ f'_7))+ \ldots \quad (5a_1)$$

The channel coefficients of the first user may be estimated from equation $(5_{a1})$, equation (6) and the FFT of the received signal 'y' (FIG. 4B). From equation $(5_{a1})$ and the FFT of the received signal 'y' of, the channel coefficients of the user 1 may be represented as $$h_1^{(12L-1)}=y^{(0)}$$

$$h_1^{(0)}=y^{(1)}$$

$$h_1^{(1)}=y^{(2)} \quad (6a)$$

wherein, $y^{(0)}$ is the value of $0^{th}$ bin of the FFT of the received signal 'y';

$y^{(1)}$ is the value of $1^{st}$ bin of the FFT of the received signal 'y' and $y^{(2)}$ is the value of $2^{nd}$ bin of the FFT of the received signal 'y' bin. The channel $h_1$ over the L RBs may be represented as $$h_i \approx \Sigma_{c=-w}^{w} Y^{((ncs+c)\% A)} f_{c \% A}$$

"A" is the number of selected sub carriers;
$Y^{((ncs+c)\% A)}$ is the $(ncs+c)\% A^{th}$ bin;
"%" denotes modulo operator;
$f_{i-1}$ is $i^{th}$ column of F;
F is an A×A IFFT matrix; and
$(i,j)^{th}$ element of the matrix corresponds to $$\left(\frac{1}{A}\right) e^{\frac{j2\pi(i-1)(j-1)}{A}}$$

$1<i,j<A$; as per the above provided example, w=1

Modulo denoted as "%" is a math operation that finds the remainder when one integer is divided by another. In writing, it is frequently abbreviated as mod, or represented by the symbol %. As an example, for any two integers s and t, s mod t=r, where 's' is the dividend, 't, is the divisor (or modulus), and 'r' is the remainder. That is to say, 3% 8=3 and −1% 8=7. In an embodiment, if the nearest neighbour bins on the left side and the right side of the largest bin 302a are not equal, then the greater number of bins may be considered as 'w'. As an example, if the number of bins on the left side of the largest bin is 2 and the number of bins on the right side is 3, then the value of 'w' may be 3.

The channel coefficients of the second user may be estimated from equation $(5_{a1})$, equation (6) and the FFT of the received signal 'y' (FIG. 4B). From equation $(5_{a1})$ and the FFT of the received signal 'y', the channel coefficients of the user 2 may be represented as $$h_2^{(12L-1)}=y^{(3)}$$

$$h_2^{(0)}=y^{(4)}$$

$$h_2^{(1)}=y^{(5)} \quad (6b)$$

wherein, $y^{(3)}$ is the value of $3^{rd}$ bin of the FFT of the received signal 'y';

$y^{(4)}$ is the value of $4^{th}$ bin of the FFT of the received signal 'y' and $y^{(5)}$ is the value of $5^{th}$ bin of the FFT of the received signal 'y'.

Considering yet another example, referring to FIG. 5B, the number of bins occupying the FFT of y is 5, when only one user, the user 1, is transmitting, $S_1=f'_0$ ('x=5'). Hence the number of cyclic shifts that may be skipped is 4 ('5−1'). If the signal transmitted by the user 1 may be $S_1=f_2$ corresponding to which the received signal at the base station 208 may be $y=(h_1 \circ f'_2)$. For the user 2, the signal transmitted by the user 2 may be $S_2=f'_7$ corresponding to which the signal at the base station 208 may be $y=(h_2 f_7)$. The third user may transmit the signal $S_3=f'_{12}$ corresponding to which the received signal at the base station 208 may be $y=(h_3 \circ f'_{12})$ and so on. Then the received signal 'y' at the base station 208 of the plurality of users may be represented as;

$$y=(h_1 \circ f'_2)+(h_2 \circ f'_7)+(h_3 \circ f'_{12}))+ \ldots \quad (5a_2)$$

The channel coefficients of the first user may be estimated from equation $(5_{a2})$ and the FFT of the received signal 'y' of. From equation $(5_{a2})$ and the FFT of the received signal 'y' of, the channel coefficients of the user 1 may be represented as $$h_1^{(12L-2)}=y^{(0)}$$

$$h_1^{(12L-1)}=y^{(1)}$$

$$h_1^{(0)}=y^{(2)}$$

$$h_1^{(1)}=y^{(3)}$$

$$h_1^{(2)}=y^{(4)} \quad (6c_1)$$

wherein, $y^{(z)}$ is the $z^{th}$ bin of the FFT of the received signal 'y'.

The channel coefficients of the second user may be estimated from equation $(5_{a2})$ and the FFT of the received signal 'y' of. From equation $(5_{a2})$ and the FFT of the received signal 'y' of, the channel coefficients of the user 2 may be represented as $$h_1^{(12L-2)}=y^{(5)}$$

$$h_1^{(12L-1)}=y^{(6)}$$

$$h_1^{(0)}=y^{(7)}$$

$$h_1^{(1)}=y^{(8)}$$

$$h_1^{(2)}=y^{(9)} \quad (6c_2)$$

wherein, $y^{(z)}$ is the $z^{th}$ bin of the FFT of the received signal 'y';

V. DECODING DATA VALUE FOR PUCCH

Having discussed the method for estimating channel for the plurality of users, method for decoding data value for PUCCH format 1 and format 2 is discussed hereunder.

A DMRS signal and a data signal may be transmitted by the UEs 210a, 210b and 210c to the base station 208. A PUCCH format may be of 2 types; type 1 and type 2, that is described in detail below.

FIG. 7A is a schematic representation of the 2 slots; slot 0 704a and slot 1 704b of format 1 of PUCCH over L resource blocks. The slot 0 704a and slot 1 704b of format 1 of PUCCH may be configured to comprise Q number of demodulation reference signal (DMRS) and D number of data symbols, wherein Q=3 and D=4. That is to say, symbols 702a, 702b, 702f and 702g of slot 0 704a (blank symbols of slot 0 704a) and symbols 702h, 702i, 702m and 702n of slot 1 704b are for carrying data and symbols 702c, 702d and 702e of slot 0 704a (dashed symbols of slot 0 704a) and symbols 702j, 702k and 702l of slot 1 704b (dashed symbols of slot 1 704b) are for carrying demodulation reference signal (DMRS). The data symbols are indexed by b=1, 2, 3, 4 for slot 0 704a and b=5, 6, 7, 8 for slot 1 704b. The DMRS signals may be indexed by a'=1, 2, 3 for slot 0 704a and a'=4, 5, 6 for slot 1 704b.

FIG. 7B is a schematic representation of the 2 slots; slot 0 704c and slot 1 704d of format 2 of PUCCH over L resource blocks. The slot 0 704c and slot 1 704d of format 2 of PUCCH may be configured to comprise Q number of demodulation reference signal (DMRS) and D number of data symbols, wherein Q=2 and D=5. That is to say, symbols 702a', 702c', 702d', 702e' and 702g' of slot 0 704c (blank symbols of slot 0 704c) and symbols 702h', 702j', 702k', 702l' and 702n' of slot 1 704d are for carrying data and symbols 702b' and 702f of slot 0 704c (dashed symbols of slot 0 704c) and symbols 702i' and 702m' of slot 1 704d (dashed symbols of slot 1 704d) are for carrying demodulation reference signal (DMRS). The data symbols are indexed by b=1, 2, 3, 4, 5 for slot 0 704c and b=5, 6, 7, 8, 9, 10 for slot 1 704d. The DMRS signals may be indexed by a'=1, 2, for slot 0 704c and a'=3, 4 for slot 704d.

The DMRS signal and the data signal may be transmitted by the UEs 210a, 210b and 210c over 'L' resource blocks, wherein L>1 RB. That is to say, the DMRS signal may be transmitted over the DMRS symbols 702c, 702d 702e over the 12L subcarriers.

Referring to FIG. 7A, a transmitted DMRS signal over the DMRS symbols 702c, 702d and 702e in slot 0 704a and 702j, 702k, and 702 1 in slot 1 704b may be the $12L_c$ subcarriers over each of the DMRS symbols 702c, 702d and 702e in slot 0 704a and 702j, 702k, and 702l in slot 1 704b may be multiplied by a first complex scalar value $w_a{}'$ per DMRS symbol, a $12L_c \times 1$ Zadaoff-Chu sequence (constant for all users) and a $12L_c \times 1$ exponential sequence (indexed by a cyclic shift) specific to that user in that symbol. A transmitted data signal over each of the data symbols 702a, 702b, 702f and 702g in slot 0 704a and 702h, 702i, 702m and 702n in slot 1 704b may be the $12L_c$ subcarriers over the data symbols 702a, 702b, 702f and 702g in slot 0 704a and 702h, 702i, 702m and 702n in slot 1 704b multiplied by second complex scalar value $\overline{w}_b$, per DMRS symbol, a scalar complex data value $d_b$ per DMRS symbol, a $12L_c \times 1$ Zadaoff-Chu sequence (constant for all users) and a $12L_c \times 1$ exponential sequence indexed by the cyclic shift specific to that user in that symbol.

Referring to FIG. 8A, and FIG. 8B, the transmitted DMRS signal and the data signal may be received by the processor 202. Referring to FIG. 8A, the DMRS signal sent over L resource blocks may be fed to a first receiver $X_{PROP\_CE\_SLOT}$ 802 for estimating the channel coefficient '$h^{(a)}{}_i$' of the UEs 210a, 210b and 210c. The output of the first receiver $X_{PROP\_CE\_SLOT}$ 802 may be further fed (along with other inputs described in detail below) to a second receiver $X_{PROP\_DATA\_SYM}$ 804 for decoding a data value $d_b$ sent on the data symbols.

Referring to FIG. 8A, and FIG. 7A, for estimating the channel coefficient '$h^{(a)}{}_i$' of individual users over 7 symbols 110 and 12L subcarriers of the slot 704, values $Y^{(a)}{}_{DMRS}$, $W_{DMRS}$ and an indicator may be provided to the first receiver $X_{PROP\_CE\_SLOT}$ 802. For PUCCH format 1, $Y^{(a)}{}_{DMRS}$ may be a set of 3 scalar values and may be obtained by multiplying the received signal value of the 12L subcarriers on the DMRS symbols 702c, 702d and 702e of slot 0 704a and 702j, 702k and 702l of slot 1 704b by the conjugate of corresponding Zadaoff-chu sequence and the exponential sequence indexed by the sum of 'a' and the cyclic shift provided to the user and then adding all the 12L values, wherein each of the cyclic shifts are 12L in length (dot product). The cyclic shifts provided to the user differ by 2w. As an example, if w=3, then the first user may be provided with $8^{th}$ cyclic shift, the next user may be provided with $15^{th}$ cyclic shift and so on. In PUCCH format 1, $Y^{(a)}{}_{DMRS}$ may be set of 3 scalar values as each slot comprises of 3 DMRS symbols over L resource blocks. Since the number of cyclic shifts provided to 'u' users may be 2w+1, the 'a' in $Y^{(a)}{}_{DMRS}$ may vary from −w to +w. That is to say, a=−w ... 0 ... +w. As an example, if w=2 and the user is provided the $8^{th}$ cyclic shift, then a=−2, −1, 0, +1 and +2 with cyclic shifts 6, 7, 8, 9 and 10. $Y^{(1)}{}_{DMRS}$ may be computed using $9^{th}$ cyclic shift, $y^{(2)}{}_{DMRS}$ may be computed using $10^{th}$ cyclic shift, $y^{(-1)}{}_{DMRS}$ may be computed using $7^{th}$ cyclic shift and $y^{(-2)}{}_{DMRS}$ using $6^{th}$ cyclic shift.

$W_{DMRS}$ may be a set of the first complex scalar values which may be the conjugate of $w_a{}'$, wherein a'=1, 2, 3 for slot 0 704a and a'=4, 5, 6 for slot 1 704b. The indicator may be an indication of the type of PUCCH format. That is to say, the indicator indicates that the type of PUCCH format is format 1.

Referring to FIG. 7B and FIG. 8A, for PUCCH format 2, $Y^{(a)}{}_{DMRS}$ may be a set of 2 scalar values and may be obtained by multiplying the received signal value of the 12L subcarriers in DMRS symbols 702b' and 702f of slot 0 704c and 702i' and 702m' of slot 1 704d by the conjugate of corresponding Zadaoff-chu sequence and the exponential sequence indexed by the sum of 'a' and the cyclic shift provided to the user and then adding all the 12 values. The variation of 'a' in $Y^{(a)}{}_{DMRS}$ may be similar to PUCCH format 1. The PUCCH format 2 may be set of 2 scalar values as each slot comprises of 2 DMRS symbols. $W_{DMRS}$ may be unity. The indicator may be an indication of the type of PUCCH format. That is to say, the indicator indicates that the type of PUCCH format is format 2.

The inputs $Y^{(a)}{}_{DMRS}$, $W_{DMRS}$ and an indicator may be fed to the first receiver $X_{PROP\_CE\_SLOT}$ 802. The first receiver $X_{PROP\_CE\_SLOT}$ 802 may multiply the Q number of $Y_{DMRS}$ values (3 $Y_{DMRS}$ for format 1 and 2 $Y_{DMRS}$ for format 2) with the corresponding $W_{DMRS}$ ($w_a{}'$, wherein a'=1, 2, 3 for slot 0 704a and a'=4, 5, 6 for slot 1 704b for format 1 and a'=1, 2 for slot 0 704c and a'=3, 4 for slot 1 704d for format 2) and may then add the Q number of products. The obtained added value may be then divided by $12*L_c*Q$. The first receiver $X_{PROP\_CE\_SLOT}$ 802 may run 2w+1 times for each $Y^{(a)}{}_{DMRS}$ That is to say, first receiver $X_{PROP\_CE\_SLOT}$ 802 may run first time with inputs $Y^{(1)}{}_{DMRS}$, $W_{DMRS}$ and indicator, second time with inputs $Y^{(2)}{}_{DMRS}$, $W_{DMRS}$ and indicator and so on till a=−w to +w. As an example, if w=3, then the first receiver $X_{PROP\_CE\_SLOT}$ 114a may run 7 times. When $Y^{(a)}$ DMRS may be the input, the output may be denoted by $hi^{(a\ \%12L}{}_c)$, where a=−w to +w may be used to estimate $h_i$, the ith user channel over 12L subcarriers.

The first receiver $X_{PROP\_CE\_SLOT}$ 802 may run maximum of 2w+1 times. If the energy of the bins is less than the P %, the first receiver $X_{PROP\_CE\_SLOT}$ 802 may run less than 2w+1 times.

Referring to FIG. 8B, the output of the first receiver $X_{PROP\_CE\_SLOT}$ 802 ($h^{(a\ \%12L}{}_c)_i$) along with values of $Y^{(a)}{}_{DATA}$, $W_{DATA}$ and the indicator may be fed to the second receiver $X_{PROP\_DATA\_SYM}$ 804 for obtaining the data value $d_b$. For PUCCH format 1, $Y^{(a)}{}_{DATA}$ may be a set of 4 scalar values and may be obtained by multiplying the received signal value of the $12L_c$ subcarriers in each of the data symbols 702a, 702b, 702f and 702g of slot 0 704a and 702h, 702i, 702m and 702n of slot 1 704b by the conjugate of corresponding Zadaoff-chu sequence and the exponential sequence indexed by the sum of 'a' and the cyclic shift provided to the user and then adding all the 12 values for each of the data symbols. In PUCCH format 1, $Y^{(a)}{}_{DATA}$ may be set of 4 scalar values as each slot comprises of 4 data symbols. $W_{DATA}$ may be set of a second complex scalar value which may be the conjugate of $\overline{w}_b$, wherein b=1, 2, 3, 4 for slot 0 704a and b=5, 6, 7, 8 for slot 704b. The indicator may be an indication of the type of PUCCH format. That is to say, the indicator indicates that the type of PUCCH format is format 1.

For PUCCH format 2, $Y^{(a)}{}_{DATA}$ may be a set of 5 scalar values and may be obtained by multiplying the received signal value of the $12L_c$ subcarriers in each of the data symbols, 702a', 702c', 702d', 702e' and 702g' of slot 0 704c and 702h', 702j', 702k', 702l' and 702n' of slot 1 704d by the conjugate of corresponding Zadaoff-chu sequence and the exponential sequence indexed by the sum of 'a' and the cyclic shift provided to the user and then adding all the 12 values in each of the data symbols. The 'a' in $Y^{(a)}{}_{DATA}$ may vary from a=-w to +w. The PUCCH format 2 may be set of 5 scalar values as each slot comprises of 5 data symbols. $W_{DATA}$ may be unity. The indicator may an indication of the type of PUCCH format. That is to say, the indicator indicates that the type of PUCCH format is format 2.

The second receiver $X_{PROP\_DATA\_SYM}$ 804 may be configured to comprise maximum of 2w+1 sub receivers $X_{LTE\_DATA\_SYM}$. A first sub receiver $X_{LTE\_DATA\_SYM}$ 806a may be fed with the a first set of inputs corresponding to a=-w, a second sub receiver $X_{LTE\_DATA\_SYM}$ may be fed with the a second set of inputs corresponding to a=-w+1 and so on and the last sub receiver $X_{LTE\_DATA\_SYM}$ 806w may be fed with the a last set of inputs corresponding to a=w. The sub-receivers may multiply the D $Y^{(a)}{}_{data}$ scalar values (D=4 for format 1 and D=5 for format 2) wither their corresponding $W_{DATA}$ ($\overline{w}_b$, wherein b=1, 2, 3, 4 for slot 0 704a and b=5, 6, 7, 8 for slot 704b for format 1 and unity for format 2) and the conjugate of $h_i^{(a\ \%12L_c)}$ to obtain D number of new scalar values $Y^{(a)'}{}_{data}$. As an example, if w=3, then first sub receiver $X_{LTE\_DATA\_SYM}$ 806a may be fed with $h^{(-3\%12L_c)}{}_i$, $Y^{(-3)}{}_{DATA}$, $W_{DATA}$ and the indicator, the second sub receiver $X_{LTE\_DATA\_SYM}$ may be fed with $h^{(-2\%12L_c)}{}_i$, $Y^{(-2)}{}_{DATA}$, $W_{DATA}$ and the indicator and so on and the last sub receiver $X_{LTE\_DATA\_SYM}$ 806w may be fed with $h^{(3\%12L_c)}{}_i$, $Y^{(3)}{}_{DATA}$, $W_{DATA}$ and the indicator The outputs, D values of $Y^{(a)'}{}_{data}$, received from each sub receiver $X_{LTE\_DATA\_SYM}$ 806a ... 806w may be added for a=-w to +w to obtain D number of the data values d=$\hat{d}$. For PUCCH format 1. the D values may be added to obtain a single estimate of $\hat{d}$ for all data symbols in that slot. And for format 2, the output may be D=5 $\hat{d}$ values in each slot as each slot comprises of 5 data symbols and value of $d_b$ may differ in each of the data symbol.

FIG. 9 is a flow chart illustrating the method for decoding the data value $d_b$.

At step 902, the $Y^{(a)}{}_{DMRS}$, $W_{DMRS}$ and the indicator may be fed to the first receiver $X_{PROP\_CE\_SLOT}$ 802, wherein a=-w to +w. At step 904, the first receiver $X_{PROP\_CE\_SLOT}$ 802 may run maximum of 2w+1 times, corresponding to each value of a. As an example, if w=2, then the first receiver $X_{PROP\_CE\_SLOT}$ 802 may run 5 times. At step 906, the first receiver $X_{PROP\_CE\_SLOT}$ 802 may generate the output $h^{(a\ \%12L_c)}{}_i$, wherein a=-w to +w. The number of outputs generated by the first receiver $X_{PROP\_CE\_SLOT}$ 802 may be 2w+1. That is to say, the outputs generated by the first receiver $X_{PROP\_CE\_SLOT}$ 802 may be $h^{(-w\ \%\ 12L_c)}{}_i$ ... $h^{(+w)}{}_i$. At step 908, the output of the first receiver $X_{PROP\_CE\_SLOT}$ 802 along with $Y^{(a)}{}_{DATA}$, $W_{DATA}$ and the indicator is fed to the second receiver $X_{PROP\_DATA\_SYM}$ 804. The first set of data ($h^{(-w\ \%\ 12L_c)}{}_i$, $Y^{(-w)}{}_{DATA}$, $W_{DATA}$ and the indicator) is fed to the first sub receiver $X_{LTE\_DATA\_SYM}$ 806a, the second set of data ($h^{((-w+1)\%12L_c)}{}_i$, $y^{(-w+1)}{}_{DATA}$, $W_{DATA}$ and the indicator) is fed to the second sub receiver $X_{LTE\_DATA\_SYM}$, and so on and the last set of data ($h^{(+w\ \%12L_c)}{}_i$, $Y^{(+w)}{}_{DATA}$, $W_{DATA}$ and the indicator) is fed to the last sub receiver $X_{LTE\_DATA\_SYM}$ 806w. At step 910, the outputs from each of the sub receivers $X_{LTE\_DATA\_SYM}$ 806a ... 806w may be added and at step 912 the D data values d may be generated by the second receiver $X_{PROP\_DATA\_SYM}$ 804.

In an embodiment, if the base station is configured to comprise of B number of antennas, then the process for a single antennae (as described above) may be repeated for each of the antennae to obtain the output $Y^{(a'b)'}{}_{DATA}$. That is to say, each of the antennae b=1 ... b=B may provide the output $Y^{(a'b)'}{}_{DATA}$. The outputs from each of the antennas may be combined by linear combination of $Y^{(a'b)'}{}_{DATA}$ for a=-w to a=+w and b=1 to b=B to obtain D number of data values $\hat{d}$. For PUCCH format 1, the D values may be added to obtain a single estimate of $\hat{d}$ for all data symbols in that slot. And for format 2, the output may be D=5 $\hat{d}$ values in each slot as each slot comprises of 5 data symbols and value of $d_b$ may differ in each of the data symbol. In an embodiment, if the base station is configured to comprise of B number of antennas, then the process for a single antennae (as described above) may be repeated for each of the antennae to obtain the output $Y^{(a'b)'}{}_{DATA}$, wherein to obtain $Y^{(a'b)'}{}_{DATA}$, $h_i^{(a\ \%12L_c)}$ for the $b^{th}$ may be unity. That is to say, each of the antennae b=1 to b=B may provide the output $Y^{(a'b)'}{}_{DATA}$. The outputs from each of the antennas may be combined by linear combination of $Y^{(a'b)'}{}_{DATA}$ for a=-w to a=+w and b=1 to b=B to obtain D number of data values $\hat{d}$. For PUCCH format 1, the D values may be added to obtain a single estimate of $\hat{d}$ for all data symbols in that slot. And for format 2, the output may be D=5 d values in each slot as each slot comprises of 5 data symbols and value of $d_b$ may differ in each of the data symbol.

Having discussed the method for decoding data value for PUCCH format 1 and format 2, method for estimating channel for the plurality of users, wherein the known sequence transmitted is different for the plurality of users is discussed hereunder.

Referring to FIG. 10, a flowchart 1000 illustrates an exemplary method to estimate the channel values of M users (may be referred to user equipment) across N subcarriers. The sum of values at each subcarrier has to be separated to compute the channel values of the transmitted signals over the subcarriers. Though we can give the algorithm to M>2 users, we specify below only for M=2. For M>2 it is a straightforward generalization. Define $F'=AF^H$ where A is the number of rows and columns of F. F' is the FFT matrix wherein the (ij)th element is $$e^{\frac{-j2\pi(i-1)(j-1)}{A}} \text{ and } 1 < i, j < A.$$

Here we assume the users to be transmitting over L RBs.

Considering N subcarriers, the processor 202 may be configured to compute $Y_1$ and $Y_2$ by using FFT matrix algorithm. A vector $Y_F$ may be obtained by vector multiplication of conjugate of their data bits with the received signals over N subcarriers. $Y_F$ is a column vector which is represented in such a way $Y_1$ and $Y_2$ form a 2×1 block column matrix.

The channel values for the first user equipment across subcarriers 1, 2 ... N may be a, b ... d respectively.

Likewise, channel values for a second user equipment across subcarriers 1,2 . . . N may be a', b' . . . d'. In LTE, a Resource Block has N=12 subcarriers. If we consider two Resource blocks, then we have N=24 subcarriers. For L RBS, N=12L. As an example, if one user equipment is transmitting through a set of subcarriers and if another user transmits across the same set of subcarriers which means at each subcarrier, we have sum of the transmission by the two user equipment's.

At step 1002, a first user equipment may transmit symbols across subcarriers 1, 2 . . . N. Likewise, the second user equipment may transmit symbols across subcarriers 1, 2 . . . N. At step 704, the received signal at subcarriers 1, 2 . . . N may be denoted as $Y=h_0 \otimes d_1 + h_2 \otimes d_2 + n$ where $\otimes$ represents element by element multiplication of two vectors. The symbols across N subcarriers for first user may be stacked into a vector which is denoted as $d_1$. Similarly, for the second user equipment these symbols may be stacked into a vector which is denoted as $d_2$. Let the channel values for the first user equipment across subcarriers 1, 2 . . . N are a, b . . . d respectively and are stacked into a channel vector $h_i$. Similarly, the channel values for the second user equipment across subcarriers 1, 2 . . . N are a', b' . . . d' respectively and stacked into a channel vector $h_2$. The processor 202 may be configured to estimate the channel values for the first and the second user equipment represented by $h_i$ and $h_2$ respectively on the received signal Y where the channel values of the first equipment i.e. (a, b . . . d) and the second user equipment i.e. (a', b', . . . d') varies slowly across the subcarriers 1, 2, . . . N. The algorithm for estimating the channel values in such scenarios is discussed in detail.

At step 1004, the processor 202 may be configured to compute the FFT of the N×1 subcarrier matrix for all the users. Let the FFT matrix function be denoted as F'. At step 1004, the processor 202 computes signals $Y_1$ and $Y_2$ using the FFT algorithm, by using the received signal "Y" across the
subcarriers of the base $Y^1 = F'^* (Y \otimes d_1^*)$
station 208. $Y_1$ and $Y_2$ are provided below.

$$Y_2 = F'^*(Y \otimes d_2^*)$$

where $d_1^*$ and $d_2^*$ corresponds to conjugate of the data symbols transmitted by the first user equipment and the second user equipment respectively. $d_1$ and $d_2$ are assumed to be unit valued complex values.

At step 1006, the signals $Y_1$ and $Y_2$ computed in the previous step may be aligned as 2×1 block column matrices comprising $Y_1$ and $Y_2$. The output of this column matrix be denoted as $Y_F$ which is expressed below.

$$Y_F = \begin{bmatrix} Y_1 \\ Y_2 \end{bmatrix}$$

At step 1008, obtained column vector $Y_F$ may be represented in terms of block diagonal matrices $F_1$, $F_2$ and $\lambda$ where the matrices can be represented as given below.

$$Y_F = F_1 * \lambda * F_2 * H$$

$$Y_F = \begin{bmatrix} \frac{F'^H}{N} & 0 \\ 0 & \frac{F'^H}{N} \end{bmatrix} * \begin{bmatrix} I & \text{diag}(\overline{d_2 \otimes d_1^*}) \\ \text{diag}(\overline{d_1 \otimes d_2^*}) & I \end{bmatrix} * \begin{bmatrix} F' & 0 \\ 0 & F' \end{bmatrix} * H$$

where $F_1$, $F_2$ and $\lambda$ are block diagonal matrices wherein element $$\frac{F'^H}{N}$$

is along diagonal for the $F_1$ matrix and element F' is along diagonal for the $F_2$ matrix. $\lambda$ is a block diagonal matrix wherein the sub blocks not along main diagonals are obtained by element by element multiplication of the data symbol transmitted by second user equipment $d_2$ to the conjugate of the symbol $d_1$ transmitted by the first user. Identity matrix is along the diagonals of the block diagonal matrix of $\lambda$. The bar on $d_1 \otimes d_2^*$ is representation of the block matrix wherein first element obtained by the computation is not altered but remaining elements thus obtained by the computation are flipped, such that, last element of the matrix occupies the second place and thereby arranged in decreasing order of the column number it has occupied. As an example, if vector $$x = \begin{bmatrix} x_1 \\ x_2 \\ x_3 \\ x_4 \end{bmatrix} \text{ then } \bar{x} = \begin{bmatrix} x_1 \\ x_4 \\ x_3 \\ x_2 \end{bmatrix}$$

where the second element of the matrix is flipped till the last element of the matrix whereas the first element of the matrix is not altered. Similarly, $\overline{d_1 \otimes d_2^*}$ may be represented in the block diagonal matrix $\lambda$ where $d_2^*$ corresponds to the conjugate of the symbol transmitted by the second user equipment. Diag(x) is a diagonal matrix where the column vector x is along the diagonal. H is given as a matrix where $H'_1$ is stacked on top of $H'_2$.

$$H'_1 = F'h_1 \text{ and } H'_2 = F'h_2.$$

At step 1010, we compute $Z_1 = F_1 * \lambda * F_2$

The rank of $Z_1$ is N. So, we select appropriate columns of $Z_1$ and call it $Z_2$ so that $Z_2$ is full column rank. For instance, using 'w' the nearest neighbour, if w=1 and N=4, we select $1^{st}$, $2^2$, $4^{th}$, $5^{th}$, $6^{th}$, $8^{th}$ columns of $Z_1$ and assign to $Z_2$. Let the $1^{st}$, $2^{nd}$, $4^{th}$, $5^{th}$, $6^{th}$, $8^{th}$ rows of H be selected and represented a $H_2$. We can approximate $Y_F$ as $Y_F = Z_2 H_2$. we can similarly generalize for any 'w' and N.

At step 1012, $H_2$ is estimated as:

$$H_2 = (Z_2^H Z_2)^{-1} Z_2^H Y_F$$

Where $(Z_2^H Z_2)^{-1} Z_2^H$ is pseudo-inverse of $Z_2$.

At step 1014, the channel value $H_2$ may be represented as the 2×1 block column matrix with $H_{21}$ (first 3 rows of $H_2$ for w=1) and $H_{22}$ (the last three rows of $H_2$ for w=1) as the elements of the block column matrix to compute the channel value $h_1$ and $h_2$ of the first user equipment and the second user equipment respectively which may be expressed as shown below.

$$H_2 = \begin{bmatrix} H_{21} \\ H_{22} \end{bmatrix}$$

$$h_1 = \frac{F'^H(:,x)}{N} H_{21}$$

$$h_2 = \frac{F'^H(:,x)}{N} H_2$$

$h_1$ and $h_2$ are the required channel values for the first user equipment and the second user equipment respectively estimated over the N subcarriers of the LTE system. Here $F'^H(:,x)$ means selecting all rows of $F'^H$ and selected columns are denoted by x, where x=1,2, . . . , w+1, N−w+1, N, N+1, . . . , N+1+w, 2N−w+1, . . . , 2N. In the example above, w=11, N=4, x=[1,2,4,5,6,8,];

VI. PILOT PATTERNS TO MITIGATE ICI

A. Conventional Solution and Problem Statement

In uplink MU-MIMO, orthogonal pilot patterns are transmitted across a resource block or RB (the quantity $$e^{\frac{j2\pi n_{cs} n}{12}}.$$

This is the conventional scheme>ICI or inter-carrier interference occurs due to a frequency offset, phase noise or Doppler spread associated with movement of user equipment (UE). But if one of the users suffers from inter-carrier interference or ICI, that affects channel estimation and data detection of all the users using the same resource block. Can we design pilot patterns that are immune to a rogue user introducing ICI, such that all users can still estimate their channel and detect data without interference? Such a pilot pattern is presented in this section.

B. Possible Use Case

A possible use case is described here and is similar to the interference-aware detection described above. Referring to FIG. 11, the have two cells, Cell-1 with base station (BS) BS1 supporting UE1 and Cell-2 with BS2 supporting UE2 on the same subcarrier as UE1. No co-operation exists between BS1 and BS2. The base stations are synchronized but a small residual frequency offset exists between them. BS1 and BS2 have more than two antennas and both UE1 and UE2 have single antennas. BS1 employs interference rejection combiner (IRC) [1] to detect UE1 amidst the interference from UE2. Likewise, BS2 also employs IRC to detect UE2 amidst the interference from UE1. The direct links are the links between UE1 (UE2) to BS1 (BS2). The cross links are the interfering links and they are UE1 (UE2) to BS2 (BS1). The direct links do not suffer from frequency offset while the cross links suffer from frequency offset as BS! and BS2 have a small residual frequency offset due to a possible bad frequency synchronization. Hence the IRC needs to detect an UE when the interfering UE has ICI due to frequency offset.

C. Design of Pilot Patterns

For simplicity, we neglect the Zadaoff-Chu sequences in the description without loss of generality. We assume two UEs each with a single antenna transmitting to $N_R$ receive antennas of the base station (BS). The second UE is impaired by intercarrier interference (ICI). Let the ICI be limited to W neighbouring subcarriers. Without loss of generality, we assume W=1 henceforth. We define then following quantities. The $a^{th}$ element of a vector x is denoted by x(a). The last element of a is a(end) (just as in Matlab). If x=[1, 2, 3, 4] and a, b are two scalars, then a new concatenated vector $x_1$=[ax b] is $x_1$=[a, 1, 2, 3, 4, b]. In general, we follow the Matlab notation for accessing and concatenation of vectors.

The pilot pattern over one RB for the ith user is denoted by 12×1 vector $g_i$. This is over 12 subcarriers.

The proposed pilot pattern is shown in FIG. 2b. We add W subcarriers on either side of the existing RB of 12 subcarriers, which will be called as the observation window and used for channel estimation. Like cyclic prefix in an OFDM system, the extra subcarrier on the right of the observation window is a copy of the first element of the observation window. The extra subcarrier to the left of the observation window is a copy of the last element of the observation window. The pilot pattern for the proposed scheme is then of length 12+2W or 14 subcarriers and for the ith user is denoted by $$g_i = [g_i(\text{end}) g_i^T g_i(1)]^T \tag{8}$$

The channel over the 12+2W=14 subcarriers associated with $i^{th}$ user and the $j^{th}$ antenna of the BS is denoted by $h_{ij}$.

The $N_R \times 1$ vector $h_i$ denotes the vector of channels over the $k^{th}$ subcarrier in the RB (note that the channel is assumed constant across the 12+2W=14 subcarriers) and is associated with the $i^{th}$ user and $N_R$ antennas of the BS. The symbol transmitted by the $i^{th}$ user on this subcarrier is $d_{i,k}$.

D. Channel Estimation

We discuss channel estimation of the first UE only. In the actual patent, we will discuss the channel estimation of the second UE as well, which has ICI. The ICI at the kth subcarrier due to the $(k+1)^{st}$ subcarrier will be called as the left-ICI. Likewise, the ICI at the $(k+1)^{st}$ subcarrier due to the kth subcarrier will be called as the right-ICI. Let the received signal across the RB in the observation window of the first antenna be denoted by y1. Let us examine the tenth subcarrier on the first antenna of the BS. We have;

$$y_1(10) = h_{11}g_1(10) + h_{21}g_2(10) + h_{21}^{(-1)}g_2(11) + h_{21}^{(1)}g \tag{9}$$

where $h_{21}^{=(-1)}$ and $h_{21}^{(1)}$ are due to the left-ICI and right-ICI, respectively. Furthermore, we have $$h_{21}^{(1)} = \psi^{(1)} h_{21} \text{ and } h_{21}^{(-1)} = \psi^{(-1)} h_{21} \tag{10}$$

The effect of the left-ICI is that we observe the vector $g_2^{(-1)}$ associated with ICI in the observation window and it is defined as $$g_2^{(-1)} = [g_2(2: \text{end})^T g_2(1)]^T \tag{11}$$

which essentially is a cyclic left shift of $g_2$. Similarly, the effect of the right-ICI is that we observe the vector $g_2^{(1)}$ associated with ICI in the observation window and it is defined as $$g_2^{(1)} = [g_2(12) g_2(1:\text{end}-1)^T]^T \tag{12}$$

which essentially is a cyclic right shift of $g_2$. The vector-version of (9) across all subcarriers in the observation window of the RB is $$y_1 = h_{11}g_1 + h_{21}g_2 + \psi^{(1)} h_{21} g_2^{(1)} + \psi^{(-1)} h_{21} g_2^{(-1)} \tag{13}$$

The orthogonal codes gi within the observation window are rows of IFFT matrix. IFFT matrix has this property that all rows/columns are orthogonal to one another. This means that $g_1$ and $g_2$ are orthogonal and $g^H_1 g_2 = 0$. The IFFT matrix has another property, that a cyclically shifted version of one row is orthogonal to any cyclically shifted version of another row. This means $$g_1^H g_2 = g_1^H g_2^{(1)} = g_1^H g_2^{(-1)} = 0 \tag{14}$$

which enables estimating the channel of the first user from (13) as $$h_{11} = \frac{g_1^H y_1}{12} \quad (15)$$

E. Data Detection

We discuss data detection of the first UE only. In the actual patent, we will discuss the data detection of the second UE as well, which has ICI. The received-signal equation across all NR antennas of the BS for the kth subcarrier is given as:

$$Y^{(k)} = h_1 d_{1,k} + h_2 d_{2,k} + \psi^{(1)} h_2 d_{2,k-1} + \psi^{(-1)} h_2 d_{2,k+1} \quad (16)$$

If $h_1$ and $h_2$ are orthogonal to one another, $d_{2,k-1}$, $d_{2,k}$ and $d_{2,k+1}$ do not interfere with detection of $d_{1,k}$ when it is detected as:

$$d_{1,k} = h_1^H y^{(k)} \quad (17)$$

Even if $h_1$ and $h_2$ are not exactly orthogonal but close to being orthogonal we get very good performances. A low-complexity user selection algorithm presented in [1] can help find almost orthogonal users. Even if number of users is as less as 8-10 users, we can still find users being close to orthogonality and an interference rejection combiner [1] can get results as good as the orthogonal case.

VII. A New Uplink Multiuser-Mimo Scheme

A. Problem Statement

Consider FIG. 13, we have four user equipment (UEs), each having $N_{tx}=4$ transmit antennas. They are transmitting to a base station (BS) with $N_{rx}=4$ antennas (it can have any number greater than four antennas). Each UE, via precoding sends one spatial stream, or a data symbol. The spatial stream sees an effective channel after precoding. This is a 4×1 channel (actually it is $N_{rx}$×1) channel. How do we determine the precoders of all the UEs such that all effective channels are orthogonal to one another? If the effective channels are all orthogonal to one another, the UEs can be decoded without interference from one another. The $i^{th}$ UE (i=1, 2, 3, 4) is associated with a $N_{rx} \times N_{tx}$ or a 4×4 channel $H_1$. The precoder is denoted by pi which is a 4×1 vector. The symbol or a spatial stream is di. The effective channel after precoding is hi=$H_i p_i$ which is a 4×1 channel. The received signal at the BS is 4×1 vector $$y = H_1 p_1 d_1 + H_2 p_2 d_2 + H_3 p_3 d_3 + H_4 p_4 d_4 \quad (1)$$

Equation (1) can be rewritten with effective channels as:

$$y = \bar{h}_1 d_1 + \bar{h}_2 d_2 + \bar{h}_3 d_3 + \bar{h}_4 d_4 \quad (2)$$

If all $\bar{h}_1, \bar{h}_2, \bar{h}_3$ and $\bar{h}_4$ are orthogonal to one another then the first UE can be decoded as $$\hat{d} = \bar{h}_1^H y \quad (3)$$

with SNR $$SNR_1 = \frac{\bar{h}_1^H \bar{h}_1}{\sigma^2} \quad (4)$$

as $\bar{h}_1$ is orthogonal to $\bar{h}_2, \bar{h}_3$, and $\bar{h}_4$ So UEs 2,3 and 4 do not interfere with UE1 and same holds good for other UEs.

So, we are solving two problems here
1) How to design precoders $p_1, p_2, p_3$ and $p_4$ such that all effective channels $\bar{h}^1, \bar{h}_2, \bar{h}_3$ and $\bar{h}_4$ are orthogonal to one another? This is discussed in detail in below.
2) How to design precoders $p_1, p_2, p_3$ and $p_4$ such that SNRs of all UEs as defined in are maximized? This is discussed in detail in below.

B. Shortcomings of Conventional Solution

In conventional solution, a single UE, say UE1 with 4×4 channel matrix $H_1$ can transmit up to four spatial streams using singular value decomposition of $H_1$ as $U_1 S_1 V_1^H = H_1$. Here the diagonal elements of the diagonal matrix $S_1$ are $s_{11}$, $s_{12}$, $s_{13}$ and $s_{14}$. There are chances of all the columns of H1 being highly correlated in which case this scheme has drawbacks with the number of spatial streams it can send. The proposed solution then is more effective, as the channels are associated with different UEs and will be uncorrelated always.

C. Choice of UE's Number of Transmit Antennas

Conventionally, a smartphone that acts as an UE will only have 2 transmit antennas, for reasons of battery usage and space limitations. But we are discussing of 4 transmit antennas per UE in this work. We present below at least two use cases where an UE can have more than two antennas.

In [2], it is mentioned that there are use cases where the number of transmit antennas of an UE could be greater than two.

Refer FIG. 14. In this use case, there is a bus that has 4 users in it. Since there are no power and space limitations on the bus, the bus can have 16 transmit antennas attached to a master UE (In massive MIMO, anyway we are having large number of antennas). The master UE speaks to the BS, which has more than four receive antennas (In general, it will have a large number of antennas if it is a massive MIMO system), The four UEs inside the bus which speak to the master UE via WLAN. The master UE acts like a hotspot. The master UE dedicates 4 of it's 16 antennas to each UE, and each UE, in effect speaks to the BS via 4 antennas of the master UE. This way, what is presented in this paper can have a practical scenario/use case as well. The master UE could act as a relay as well, and communication between 4 UEs to master UE and master UE to BS can all be LTE signals as well.

D. Proposed Solution on Orthogonality

We will design precoders for UEs 1, 2, 3 and 4 in that order in this section.

1) Precoder $p_1$ is designed such that SNR of first UE is maximized as per (4). $p_1$ is designed such that $$p_1^H H_1^H H_1 p_1 \quad (5)$$

is maximized and as per Rayleigh Quotient [1] when p1 is the eigenvector corresponding to the maximum eigenvalue of $H_1^H H_1$.

2) We design $p_2$ such that $\bar{h}_1$ is orthogonal to $\bar{h}_2$. This means that, $\bar{h}_1^H H_2 p_2 = 0$ or in other words we choose $p_2$ from the null space of $X_2 = \bar{h}_1^H H_2$ which has a dimension of 3. To maximize the SNR as per (4), we have to choose $p_2$ intelligently from the null space of $\bar{h}_1^H H_2$. This is discussed in more detail below.

3) We design $p_3$ such that $\bar{h}_3$ is orthogonal to $\bar{h}_1$ and $\bar{h}_2$. This means that $\bar{h}_1 H_3 p_3 = \bar{h}_2 H_3 p_3 = 0$ or in other words we choose $p_3$ from the null space of $$X_3 = \begin{bmatrix} \bar{h}_1^H H_3 \\ \bar{h}_2^H H_3 \end{bmatrix} \quad (6)$$

which has a dimension of 2. To maximize the SNR as per (4), we have to choose $p_3$ intelligently from the null space of $X_3$. This is discussed in more detail below.

4) We design $p_4$ such that $\bar{h}_4$ is orthogonal to $\bar{h}_1$, $\bar{h}_2$ and $\bar{h}_2$. This means that $\bar{h}_1^H H_4 p_4 = \bar{h}_2^H H_4 p_4 = \bar{h}_3^H H_4 p_4 = 0$ or in other words we choose $p_3$ from the null space of $$X_4 = \begin{bmatrix} \bar{h}_1^H H_4 \\ \bar{h}_2^H H_4 \\ \bar{h}_3^H H_4 \end{bmatrix} \quad (7)$$

which has a dimension of 1. Unlike UEs 2 and 3, to maximize the SNR as per (4), we cannot choose p4 intelligently from the null space of X4 as it has dimension equal to one.

E. Proposed Solution on Maximizing Snr

In Section D, Enumerated Item 1, we considered the first UE. We in fact can select the UE whose value computed as per (5) is the highest as the first UE.

In Section III, Enumerated Item 2, for UE 2, the precoder p2 can be from null space of $X_2 = \bar{h}_1^H H_2$ which has a dimension of 3. To maximize the SNR as per (4), we have to choose $p_2$ intelligently from the null space of $X2 = \bar{h}_1^H H_2$ We have to choose $p_2$ such that $$X_2 p_2 = 0 \quad (8)$$

And maximizes $$p_2^H H_2^H H_2 p_2 \quad (9)$$

is maximized.

One way of doing the above is as follows

Let the singular value decomposition of $H_2$ be $U_2 S_2 V^H$ with columns of $V_2$ as $v_{21}$, $v_{22}$, $v_{23}$ and $v_{24}$. This is also the eigenvectors of $H_2^H H_2$. Note that the eigenvector $v_{21}$, $v_{22}$, $v_{23}$ and $v_{24}$ are associated with eigenvalues in decreasing order.

Since the dimension of null space of $X_2$ is three, any three of $v_{21}$, $v_{22}$, $v_{23}$ and $v_{24}$ will be present in null space $X_2$. We choose the eigenvector that is present in null space of $X_2$ that corresponds to the maximum eigenvalue of $H_2^H H_2$ as $p_2$. For example, if $v_{22}$, $v_{23}$ and $v_{24}$ are present in null space of $X_2$, then $p_2 = v_{22}$.

The precoder for UE 3 is designed accordingly from null space of $X_3$ which has a dimension 2. Precoder for UE 4 is just the null column vector of $X_4$.

F. User Selection

User selection can be done in two ways to help improve the overall spectral efficiency of the system In Section D, Enumerated Item 1, we selected UE 1 as the first UE. We could have as well selected the UEs 2, 3 and 4 as the first UE. At this stage we could select the best UE instead of the UE 1. This way we could select the best candidate UE at each stage in Section III.

In Section D, Enumerated Item 2, we selected UE 2 as the second UE. We could have as well selected the UE 3 and UE 4 as the second UE. At this stage we could select the best UE instead of the UE 2. This way we could select the best candidate UE at each stage in Section III.

This work deals with 4 UEs. If we had N UEs, we could select 4 UEs in $$\binom{N}{4}$$

ways and that will further increase the spectral efficiency.

G. Other Scenarios

We had 4 UEs, with four antennas transmitting to a BS with 4 antennas and each UE transmitted one spatial stream. Other combinations are possible. Three UEs with four transmit antennas, the first UE transmitting two spatial streams and second and third UE transmitting one spatial stream each.

It should be understood that the capabilities of the invention described in the present disclosure and elements shown in the figures may be implemented in various forms of hardware, firmware, software, recordable medium or combinations thereof.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. A method for accommodating users in an uplink channel, the method comprising:
   selecting, by a processor, a region of sub carriers in a frequency domain, wherein channel value of a plurality of users over the selected region varies gradually;
   selecting, by the processor, sub carriers within the selected region of sub carriers by skipping sub carriers by an integer value which is 0 or more than 0;
   transmitting over the selected sub carriers, either a product of a known sequence and an exponential sequence for channel estimation or a product of the known sequence and the exponential sequence and a data value for data detection, wherein the exponential sequence is characterized by a cyclic shift value, wherein the cyclic shift value provided to any two users, among the plurality of users, is separated by at least 2w, wherein "w" is a nearest neighbour value and the value of "w" is configurable;
   performing, by a base station, channel estimation of the users using the received selected sub carriers within the selected region; and
   performing data detection for the users over the selected sub carriers using the estimated channel value.

2. The method of claim 1, wherein, the integer value is 1 in case of an SRS (Sounding Reference Signal) transmission, wherein the selected region comprises of $8*L_{SRS}$ subcarriers, wherein $L_{SRS}$ is greater than 1.

3. The method of claim 2, wherein the cyclic shift value provided to the plurality of users varies from 0 to $(8*L_{SRS}-1)$ in SRS transmission.

4. The method of claim 1, wherein, the integer value is 0 in case of a PUCCH Physical Uplink Control Channel) and a PUSCH (Physical Uplink Shared Channel) transmissions, wherein the selected region comprises of $12*L_c$ subcarriers, wherein $L_c$ is greater than 1.

5. The method of claim 4, wherein the cyclic shift value provided to the plurality of users varies from 0 to $(12*L_c-1)$ in the PUCCH and the PUSCH transmissions.

6. The method of claim 1, wherein the value of "w" is such that when a single user with cyclic shift "$n_{cs}$" is transmitted and FFT is computed on the selected sub carriers, then probability of value of FFT bin outside $(n_{cs}-w)\%$ A and $(n_{cs}+w)\%$ A being greater than a predetermined percent of the $n_{cs}^{th}$ FFT bin is negligible, wherein "A" is the number of selected sub carriers and "%" denotes modulo operator.

7. The method of claim 6, wherein performing the channel estimation for the users, wherein performing the channel estimation for the "$i^{th}$" user transmitting using cyclic shift value "$n_{cs}$" for one antenna at the base station comprises:
multiplying the selected region of the sub carriers by the conjugate of the known sequence;
taking FFT of the product;
computing channel vector, $h_i$, of the "$i^{th}$" user over the selected region of the sub carriers, wherein,
$h_i \approx \Sigma_{c=-w}^{w} Y^{((n_{cs}+c)\% A)} f_{c\%A}$
"A" is the number of selected sub carriers;
$Y^{((ncs+c)\% A)}$ is the $(ncs+c)\% A^{th}$ bin;
"%" denotes modulo operator;
$f_{i-1}$ is $i^{th}$ column of F;
F is an A×A IFFT matrix; and
$(i,j)^{th}$ element of the matrix corresponds to $(1/A)e^{\frac{j2\pi(i-1)(j-1)}{A}}$ and $1 < i, j < A$;

and
$Y^{((n_{cs}+c)\% A)} = h_i^{(c\%A)}$ and
repeating the above steps for all the antennas configured at the base station.

8. The method of claim 1, wherein the known sequence is same for all the users.

9. The method of claim 1, wherein the known sequence is different for plurality of the users.

10. The method of claim 1, wherein maximum number of the users accommodated is $$u = \frac{KL}{2w+1},$$

wherein KL represents the number of subcarriers used for transmitting the signal;
"K" is 8 and $L=L_{SRS}$ in case of SRS transmission;
"K" is 12 and $L=L_c$ in case of PUCCH and PUSCH transmissions,
wherein "L" is greater than 1; and
"w" is the nearest neighbour value.

11. The method of claim 1, wherein in case of PUCCH transmission, PUCCH is transmitted over 7 symbols wherein data symbols and DMRS symbols are transmitted over $L_c$ resource blocks, which is $12L_c$ subcarriers, wherein the data symbols are indexed by a value "b" and the DMRS symbols are indexed by a value "a", the data symbols will transmit product of the known sequence of $12L_c$ values, a data symbol $d_b$, a constant scalar value $\overline{w}_b$ and $12L_c$ values of the exponential sequence indexed by cyclic shift, the DMRS will transmit products of the known sequence of $12L_c$ values, a constant scalar value $w_a$, and $12L_c$ values of the exponential sequence indexed by cyclic shift, wherein $L_c$ is greater than 1.

12. The method of claim 11, wherein performing the channel estimation for the users in case of PUCCH transmission, wherein performing the channel estimation for "$i^{th}$" user for one antenna at the base station comprises:
calculating one scalar value per DMRS symbol, wherein the scalar value is obtained as dot product of two $12L_c \times 1$ vectors, wherein a first of the two vectors is the received signal over $12L_c$ sub carriers for that DMRS symbol and a second of the two vectors is a $12L_c \times 1$ vector, which is a conjugate of the product of the known sequence and the exponential sequence using cyclic shift $((n_{cs}+a)\%12L_c)$, where "$n_{cs}$" corresponding to cyclic shift value corresponding to the that DMRS symbol for the "$i^{th}$" user and "$L_c$" is greater than 1;
calculating "Q" number of scalar values for Q number for the DMRS symbols, wherein Q=3 for a first format and Q=2 for a second format;
multiplying the Q number of determined scalar values, $Y^{(a)}_{DMRS}$, with their corresponding predefined $W_{DMRS}$;
adding the obtained Q number of products;
dividing the obtained added value by Q to obtain $h_i^{(a\%12Lc)}$ repeating the above steps for a=−w to a=+w; and
computing channel vector, $h_i$, corresponding to the antenna, of the "$i^{th}$" user over the selected region of the sub carriers, wherein, $$h_i \approx \sum_{a=-w}^{w} h_i^{(a\%12Lc)} f_{a\%12Lc}$$

repeating the above steps for all the antennas configured at the base station.

13. The method of claim 12, further comprising data detection using the estimated channel, the data detection comprising:
calculating one scalar value per data symbol, wherein the scalar value is obtained as dot product of two $12L_c \times 1$ vectors, wherein a first of the two vectors is the received signal over $12L_c$ sub carriers for that data symbol and a second of the two vectors is a $12L_c \times 1$ vector, which is a conjugate of the product of the known sequence and the exponential sequence using cyclic shift $((n_{cs}+a)\%12L_c)$, where "$n_{cs}$" corresponding to cyclic shift value corresponding to the that data symbol for the "$i^{th}$" user and "$L_c$" is greater than 1;
calculating "D" number of scalar values for D number for the data symbols, wherein D=4 for a first format and D=5 for a second format;
multiplying the D number of determined scalar values, $Y^{(a)}_{data}$, with their corresponding predefined $W_{DATA}$ and conjugate of $h_i^{(a\%12Lc)}$ to obtain D number of new scalar values $Y^{(a)'}_{DATA}$;
repeating the above steps for a=−w to a=+w; and
adding $Y^{(a)'}_{DATA}$ for a=−w to a=+w to obtain D number of new scalar values $\hat{d}$;
wherein $\hat{d}$ is the estimate of the D data symbols transmitted in one slot of format 2 and the average of $\hat{d}$ across both the slots for format 1 is the estimate of the lone data symbol transmitted in format 1.

14. The method of claim 12, further comprising data detection using the estimated channel, by 'B' number of antennas, the data detection by $b^{th}$ antenna comprising:
  calculating one scalar value per data symbol, wherein the scalar value is obtained as dot product of two $12L_c \times 1$ vectors, wherein a first of the two vectors is the received signal over $12L_c$ sub carriers for that data symbol and a second of the two vectors is a $12L_c \times 1$ vector, which is a conjugate of the product of the known sequence and the exponential sequence using cyclic shift $((n_{cs}+a)\%12L_c)$, where "$n_{cs}$" corresponding to cyclic shift value corresponding to the that data symbol for the "$i^{th}$" user and "$L_c$" is greater than 1;
  calculating "D" number of scalar values for D number for the data symbols, wherein D=4 for a first format and D=5 for a second format;
  multiplying the D number of determined scalar values, $Y^{(a,b)}{}_{DATA}$, with their corresponding predefined $W_{DATA}$ and conjugate of $h_i^{(a~\%12Lc,b)}.h_i^{(a~\%12Lc)}$ of the $b^{th}$ antennae, to obtain D number of new scalar values $Y^{(a,b)'}{}_{DATA}$;
  repeating the above steps for a=−w to a=+w; and
  computing linear combination on $Y^{(a,b)'}{}_{DATA}$ for a=−w to a=+w and b=1 to b=B to obtain D number of new scalar values $\hat{d}$; wherein $\hat{d}$ is the estimate of the D data symbols transmitted in one slot of format 2 and the average of $\hat{d}$ across both the slots for format 1 is the estimate of the lone data symbol transmitted in format 1.

15. The method of claim 12, further comprising data detection using the estimated channel, by 'B' number of antennas, the data detection by $b^{th}$ antenna comprising:
  calculating one scalar value per data symbol, wherein the scalar value is obtained as dot product of two $12L_c \times 1$ vectors, wherein a first of the two vectors is the received signal over $12L_c$ sub carriers for that data symbol and a second of the two vectors is a $12L_c \times 1$ vector, which is a conjugate of the product of the known sequence and the exponential sequence using cyclic shift $((n_{cs}+a)~\%12L_c)$, where "$n_{cs}$" corresponding to cyclic shift value corresponding to the that data symbol for the "$i^{th}$" user and "$L_c$" is greater than 1;
  calculating "D" number of scalar values for D number for the data symbols, wherein D=4 for a first format and D=5 for a second format;
  multiplying the D number of determined scalar values, $Y^{(a,b)}{}_{DATA}$, with their corresponding predefined $W_{DATA}$ to obtain D number of new scalar values $Y^{(a,b)'}{}_{DATA}$;
  repeating the above steps for a=−w to a=+w and b=1 to b=B; and
  computing linear combination on $Y^{(a,b)'}{}_{DATA}$ for a=−w to a=+w and b=1 to b=B to obtain D number of new scalar values $\hat{d}$; wherein $\hat{d}$ is the estimate of the D data symbols transmitted in one slot of format 2 and the average of $\hat{d}$ across both the slots for format 1 is the estimate of the lone data symbol transmitted in format 1.

16. The method of claim 1, wherein in case of PUCCH transmission, PUCCH is transmitted over 7 symbols wherein data symbols and DMRS symbols are transmitted over $L_c$ resource blocks, which is $12L_c$ subcarriers, wherein the data symbols are indexed by a value "b" and the DMRS symbols are indexed by a value "a", the data symbols will transmit product of the known sequence of $12L_c$ values, a data symbol $d_b$, a constant scalar value $\overline{w}_b$ and $12L_c$ values of the exponential sequence indexed by cyclic shift, the DMRS will transmit products of the known sequence of $12L_c$ values, a constant scalar value $w_a$, and $12L_c$ values of the exponential sequence indexed by cyclic shift, wherein $L_c$ is 1.

17. The method of claim 16, wherein performing the channel estimation for the users in case of PUCCH transmission, wherein performing the channel estimation for "$i^{th}$" user for one antenna at the base station comprises:
  calculating one scalar value per DMRS symbol, wherein the scalar value is obtained as dot product of two $12L_c \times 1$ vectors, wherein a first of the two vectors is the received signal over $12L_c$ sub carriers for that DMRS symbol and a second of the two vectors is a $12L_c \times 1$ vector, which is a conjugate of the product of the known sequence and the exponential sequence using cyclic shift $((n_{cs}+a)~\%12L_c)$, where "$n_{cs}$" corresponding to cyclic shift value corresponding to the that DMRS symbol for the "$i^{th}$" user and "$L_c$" is greater than 1;
  calculating "Q" number of scalar values for Q number for the DMRS symbols,
  wherein Q=3 for a first format and Q=2 for a second format;
  multiplying the Q number of determined scalar values, $Y^{(a)}{}_{DMRS}$, with their corresponding predefined $W_{DMRS}$;
  adding the obtained Q number of products;
  dividing the obtained added value by Q to obtain $h_i^{(a~\%12Lc)}$;
  repeating the above steps for a=−w to a=+w; and
  computing channel vector, $h_i$, corresponding to the antenna, of the "$i^{th}$" user over the selected region of the sub carriers, wherein, $$h_i \approx \sum_{a=-w}^{w} h_i^{(a\%12Lc)} f_{a\%12Lc}$$

repeating the above steps for all the antennas configured at the base station.

18. The method of claim 17, further comprising data detection using the estimated channel, the data detection comprising:
  calculating one scalar value per data symbol, wherein the scalar value is obtained as dot product of two $12L_c \times 1$ vectors, wherein a first of the two vectors is the received signal over $12L_c$ sub carriers for that data symbol and a second of the two vectors is a $12L_c \times 1$ vector, which is a conjugate of the product of the known sequence and the exponential sequence using cyclic shift $((n_{cs}+a)~\%12L_c)$, where "$n_{cs}$" corresponding to cyclic shift value corresponding to the that data symbol for the "$i^{th}$" user and "$L_c$" is greater than 1;
  calculating "D" number of scalar values for D number for the data symbols, wherein D=4 for a first format and D=5 for a second format;
  multiplying the D number of determined scalar values, $Y^{(a)}{}_{data}$, with their corresponding predefined $W_{DATA}$ and conjugate of $h_i^{(a~\%12Lc)}$ to obtain D number of new scalar values $Y^{(a)'}{}_{DATA}$;
  repeating the above steps for a=−w to a=+w; and
  adding $Y^{(a)'}D_{ATA}$ for a=−w to a=+w to obtain D number of new scalar values $\hat{d}$;
  wherein $\hat{d}$ is the estimate of the D data symbols transmitted in one slot of format 2 and the average of $\hat{d}$ across both the slots for format 1 is the estimate of the lone data symbol transmitted in format 1.

19. The method of claim 17, further comprising data detection using the estimated channel, by 'B' number of antennas, the data detection by bth, antenna comprising:

calculating one scalar value per data symbol, wherein the scalar value is obtained as dot product of two $12L_c \times 1$ vectors, wherein a first of the two vectors is the received signal over $12L_c$ sub carriers for that data symbol and a second of the two vectors is a $12L_c \times 1$ vector, which is a conjugate of the product of the known sequence and the exponential sequence using cyclic shift $((n_{cs}+a)\ \%12L_c)$, where "$n_{cs}$" corresponding to cyclic shift value corresponding to the that data symbol for the "$i^{th}$" user and "$L_c$" is greater than 1;

calculating "D" number of scalar values for D number for the data symbols, wherein D=4 for a first format and D=5 for a second format;

multiplying the D number of determined scalar values, $Y^{(a,b)}_{DATA}$, with their corresponding predefined $W_{DATA}$ and conjugate of $h_1^{(a\ \%12Lc,b)}), h_i^{(a\ \%12Lc)}$ of the $b^{th}$ antennae, to obtain D number of new scalar values $Y^{(a,b)'}_{DATA}$;

repeating the above steps for a=−w to a=+w; and computing linear combination on $Y^{(a,b)'}_{DATA}$ for a=−w to a=+w and b=1 to b=B to obtain D number of new scalar values $\hat{d}$; wherein $\hat{d}$ is the estimate of the D data symbols transmitted in one slot of format 2 and the average of $\hat{d}$ across both the slots for format 1 is the estimate of the lone data symbol transmitted in format 1.

\* \* \* \* \*